(12) United States Patent
Yamauchi et al.

(10) Patent No.: US 8,996,811 B2
(45) Date of Patent: Mar. 31, 2015

(54) SCHEDULER, MULTI-CORE PROCESSOR SYSTEM, AND SCHEDULING METHOD

(71) Applicant: Fujitsu Limited, Kawasaki-shi, Kanagawa (JP)

(72) Inventors: Hiromasa Yamauchi, Kawasaki (JP); Koichiro Yamashita, Hachioji (JP); Takahisa Suzuki, Kawasaki (JP); Koji Kurihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 197 days.

(21) Appl. No.: 13/749,606

(22) Filed: Jan. 24, 2013

(65) Prior Publication Data

US 2013/0138886 A1    May 30, 2013

Related U.S. Application Data

(63) Continuation of application No. PCT/JP2010/064566, filed on Aug. 27, 2010.

(51) Int. Cl.

| | | |
|---|---|---|
| *G06F 12/08* | (2006.01) | |
| *G06F 9/48* | (2006.01) | |
| *B29D 22/00* | (2006.01) | |
| *B29C 49/06* | (2006.01) | |
| *B29C 49/42* | (2006.01) | |
| *B29C 49/18* | (2006.01) | |
| *B29C 49/64* | (2006.01) | |

(52) U.S. Cl.
CPC ............ *B29D 22/003* (2013.01); *B29C 49/062* (2013.01); *B29C 49/4215* (2013.01); *G06F 12/0811* (2013.01); *B29C 49/18* (2013.01); *B29C 49/6427* (2013.01)
USPC .......................................... 711/120

(58) Field of Classification Search
None
See application file for complete search history.

(56) References Cited

U.S. PATENT DOCUMENTS

| | | | |
|---|---|---|---|
| 6,223,256 B1 | 4/2001 | Gaither | |
| 6,691,080 B1 | 2/2004 | Tachibana | |
| 8,826,049 B2 * | 9/2014 | Balakrishnan et al. | ....... 713/320 |

(Continued)

FOREIGN PATENT DOCUMENTS

| | | |
|---|---|---|
| JP | 62-008242 A | 1/1987 |
| JP | 02-238556 A | 9/1990 |

(Continued)

OTHER PUBLICATIONS

Japanese Office Action, Application No. 2012-530494 dated Oct. 8, 2013.

(Continued)

*Primary Examiner* — Kevin Verbrugge
(74) *Attorney, Agent, or Firm* — Arent Fox LLP

(57) ABSTRACT

A scheduler that causes a given core in a multi-core processor to determine if a priority level of a process that is to be executed by a core of the multi-core processor is greater than or equal to a threshold; save to a cache memory of each core that executes a process having a priority level greater than or equal to the threshold, data that is accessed by the process upon execution; save to a memory area different from the cache memory and to which access is relatively slower, data that is accessed by a process having a priority level not greater than or equal to the threshold; and save the data saved in the memory area, to a cache memory of a requesting core, when the requesting core issues an access request for the data saved in the memory area.

10 Claims, 20 Drawing Sheets

(56) References Cited

U.S. PATENT DOCUMENTS

| | | | |
|---|---|---|---|
| 2005/0071572 A1 | 3/2005 | Nakashima et al. | |
| 2007/0067574 A1 | 3/2007 | Stempel et al. | |
| 2011/0247004 A1* | 10/2011 | Matsukawa | 718/104 |
| 2012/0124590 A1* | 5/2012 | Balakrishnan et al. | 718/103 |

FOREIGN PATENT DOCUMENTS

| | | |
|---|---|---|
| JP | 05-073420 A | 3/1993 |
| JP | 06-175923 A | 6/1994 |
| JP | 07-248967 A | 9/1995 |
| JP | 10-240698 A | 9/1998 |
| JP | 11-96074 A | 4/1999 |
| JP | 11-212869 A | 8/1999 |
| JP | 2000-276381 A | 10/2000 |
| JP | 2005/078264 A | 3/2005 |
| JP | 2009-509274 A | 3/2009 |

OTHER PUBLICATIONS

International Preliminary Report on Patentability dated Mar. 28, 2013 issued in International Patent Application No. PCT/JP2010/064566 (with English translation).

Japanese Office Action issued Feb. 3, 2015; Japanese Application No. 2014-077378, with English Translation.

* cited by examiner

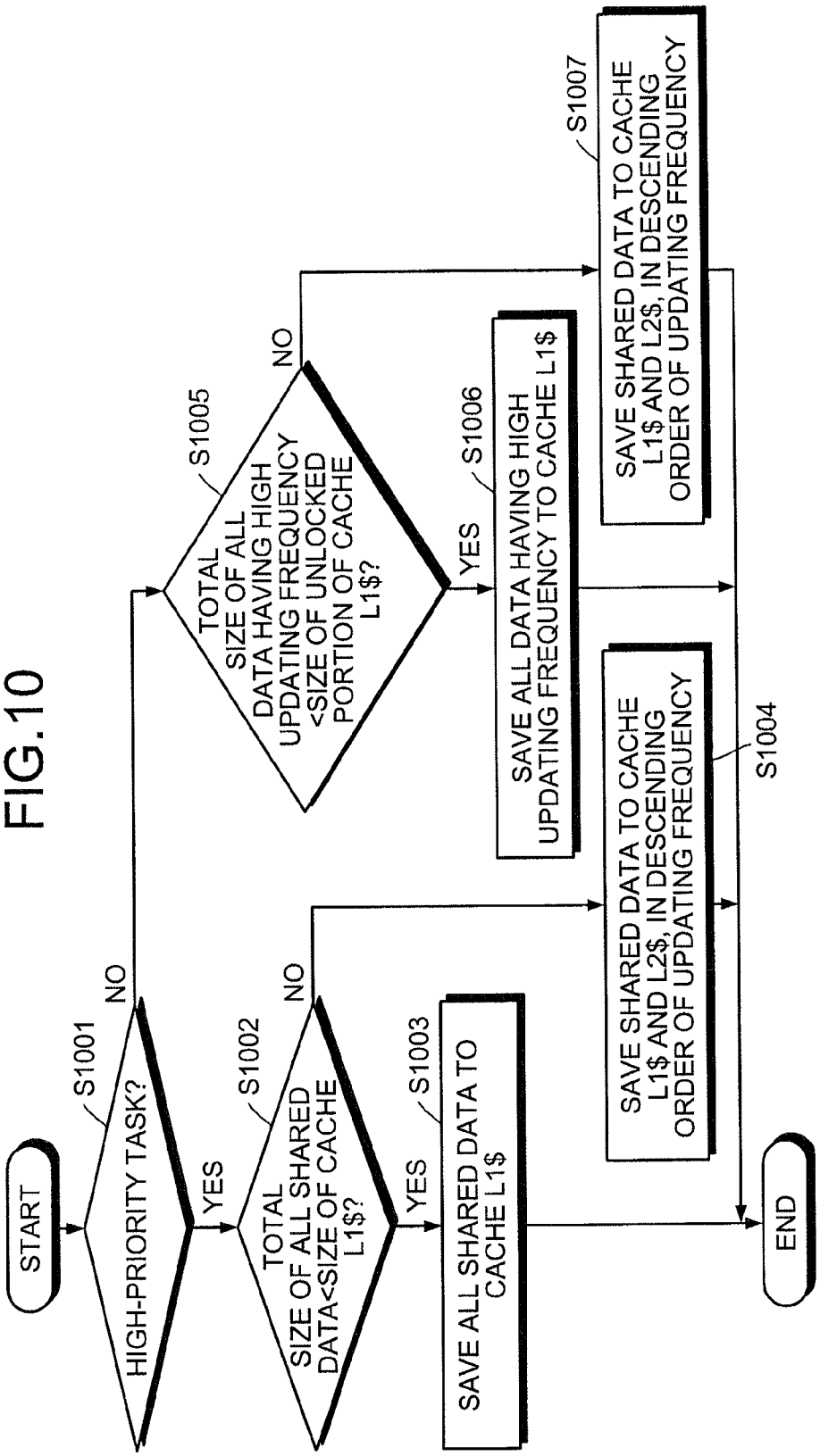

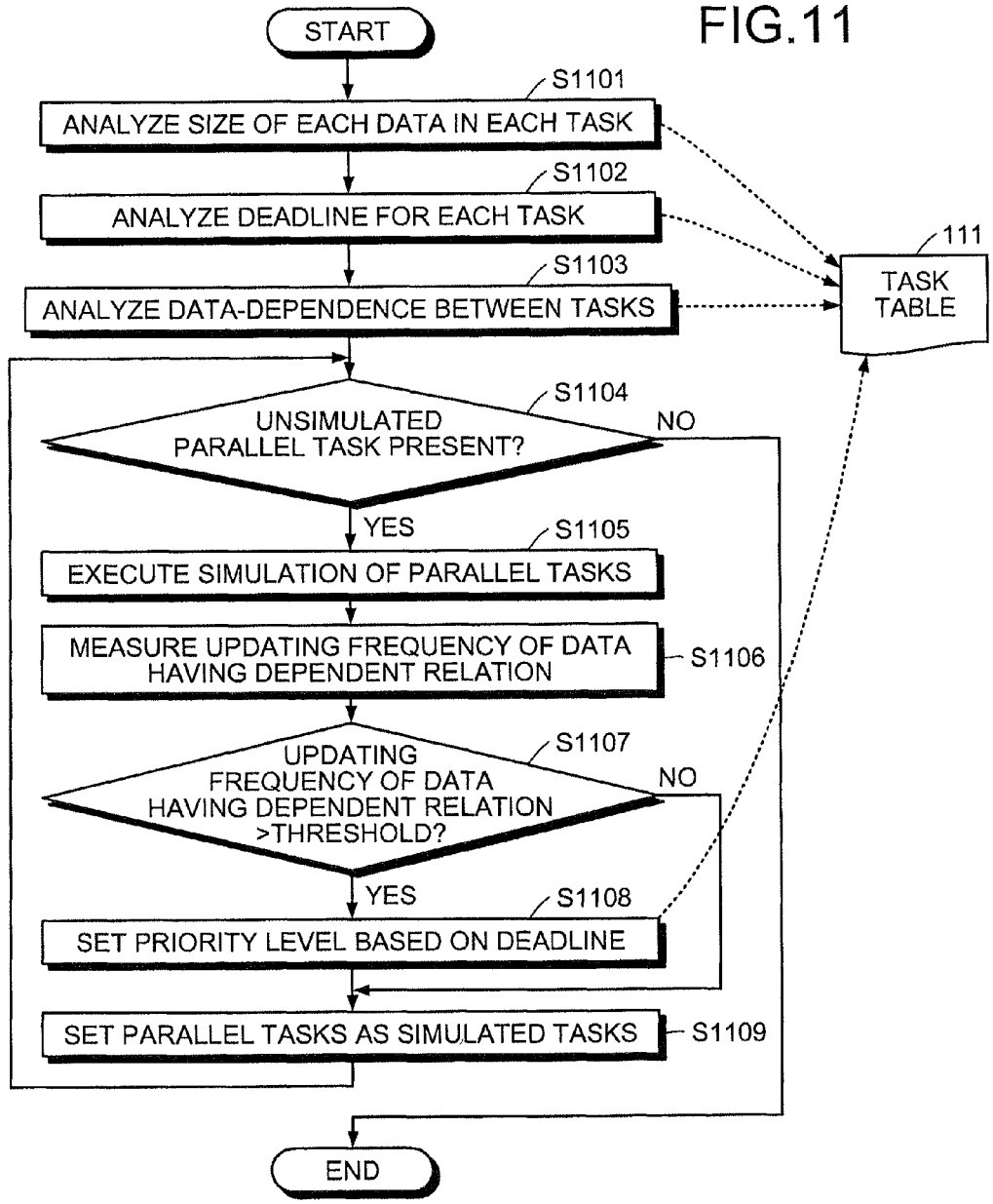

DATA STRUCTURE OF TASK TABLE

| | | |
|---|---|---|
| TASK INFORMATION | TASK NAME | |
| | TASK ID | |
| | DEADLINE | |
| | PRIORITY LEVEL | HIGH/LOW |
| | COHERENCE MODE | UPDATING AT WRITING/ UPDATING AT READING |
| | FORKING TO OTHER CPU | PERMITTED/NOT PERMITTED |
| SHARED DATA INFORMATION | SHARED DATA NAME | |
| | SHARED DATA ID | |
| | UPDATING FREQUENCY | |
| | CACHE LEVEL IN WHICH DATA IS SAVED | L1/L2 |
| | DATA SIZE | |

DATA STRUCTURE OF TASK TABLE

| | | |
|---|---|---|
| TASK INFORMATION | TASK NAME | TASK #0 |
| | TASK ID | 0 |
| | DEADLINE | 30 ms |
| | PRIORITY LEVEL | HIGH |
| | COHERENCE MODE | UPDATING AT WRITING |
| | FORKING TO OTHER CPU | PERMITTED |
| SHARED DATA INFORMATION | SHARED DATA NAME | DATA #0 |
| | SHARED DATA ID | 0 |
| | UPDATING FREQUENCY | 1000 |
| | CACHE LEVEL IN WHICH DATA IS SAVED | L1 |
| | DATA SIZE | 10 KB |

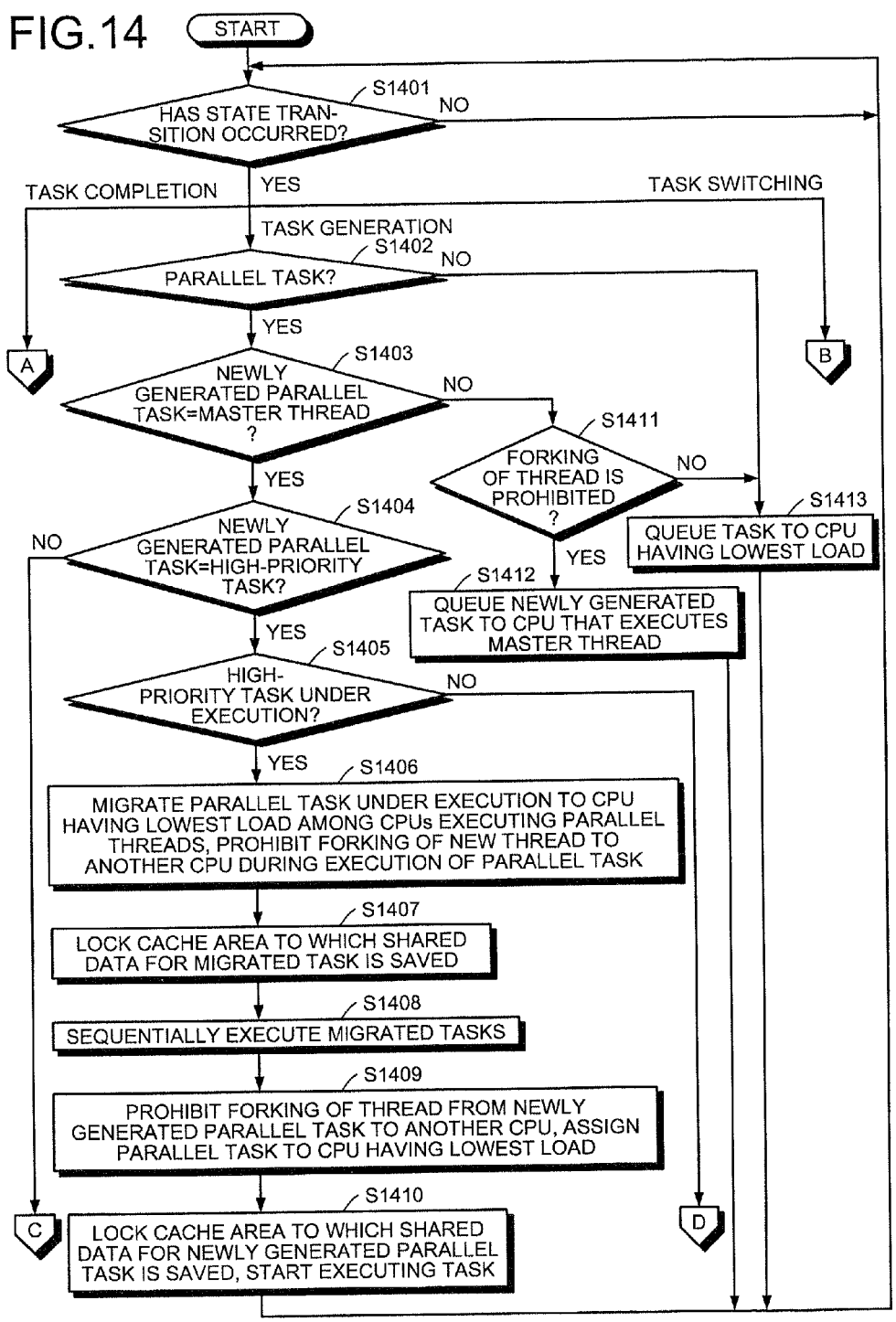

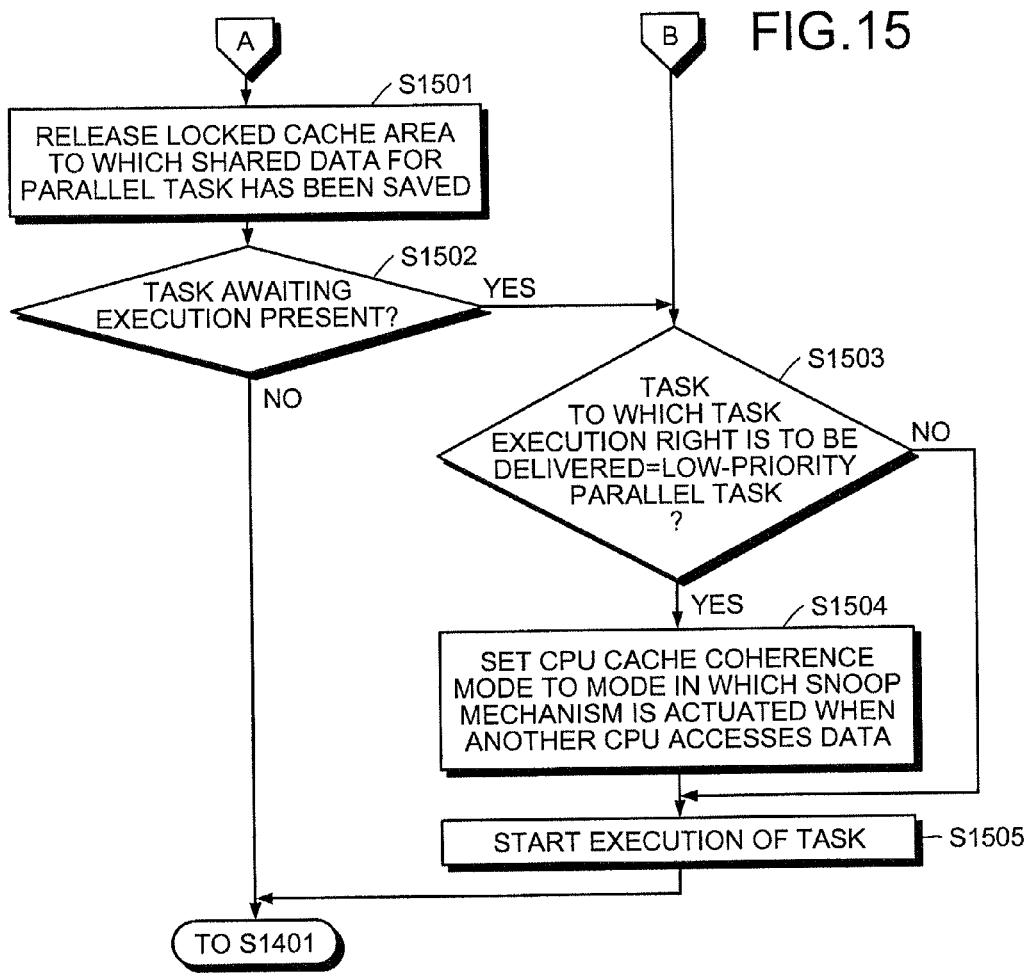

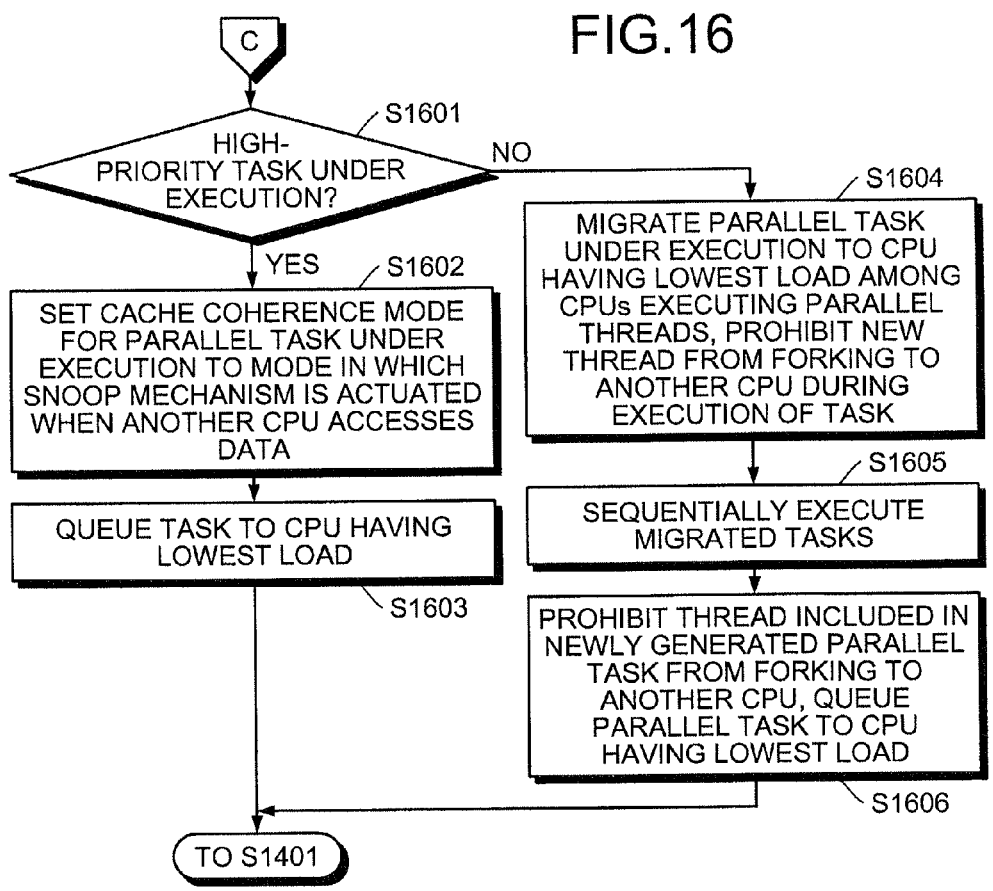

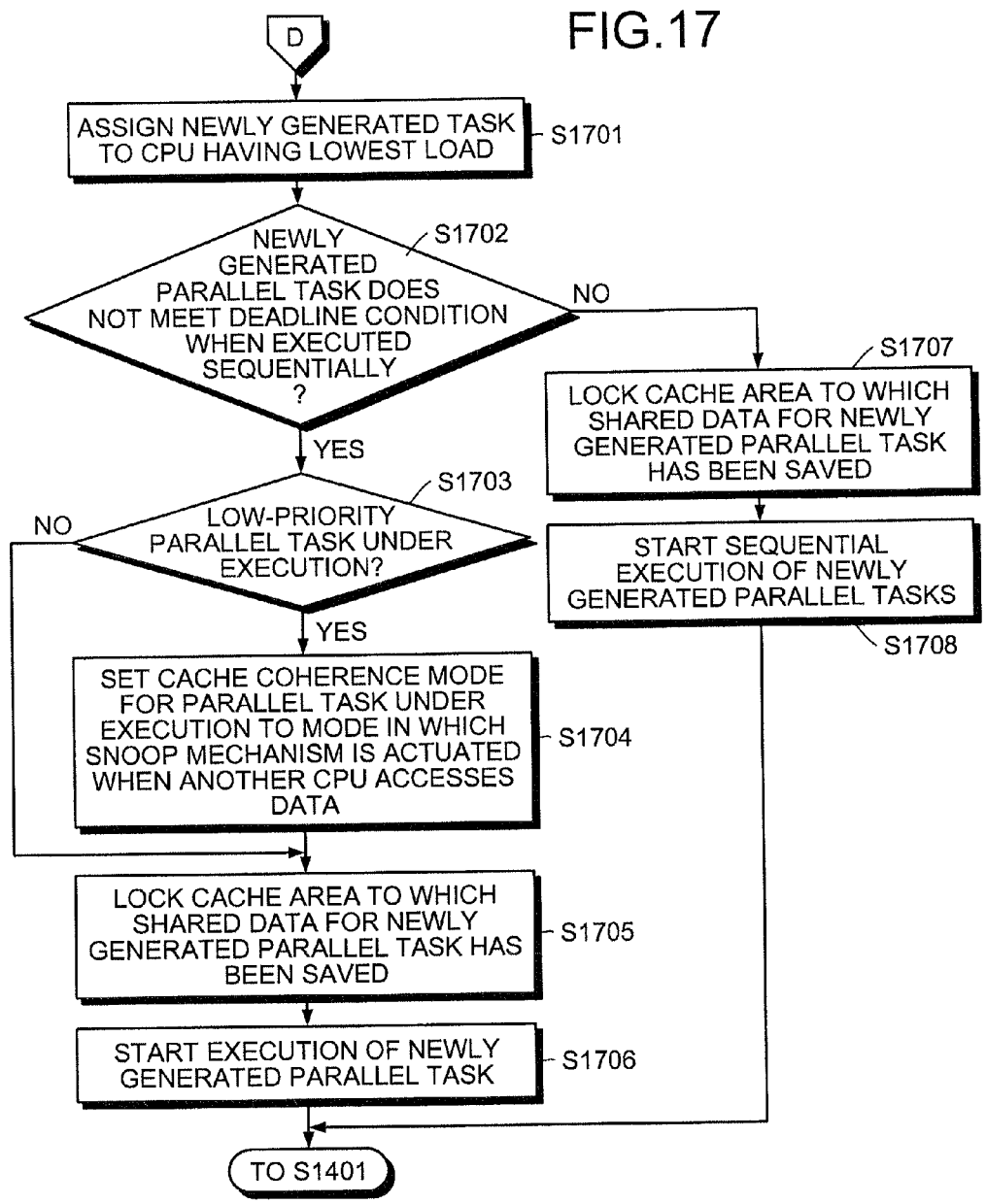

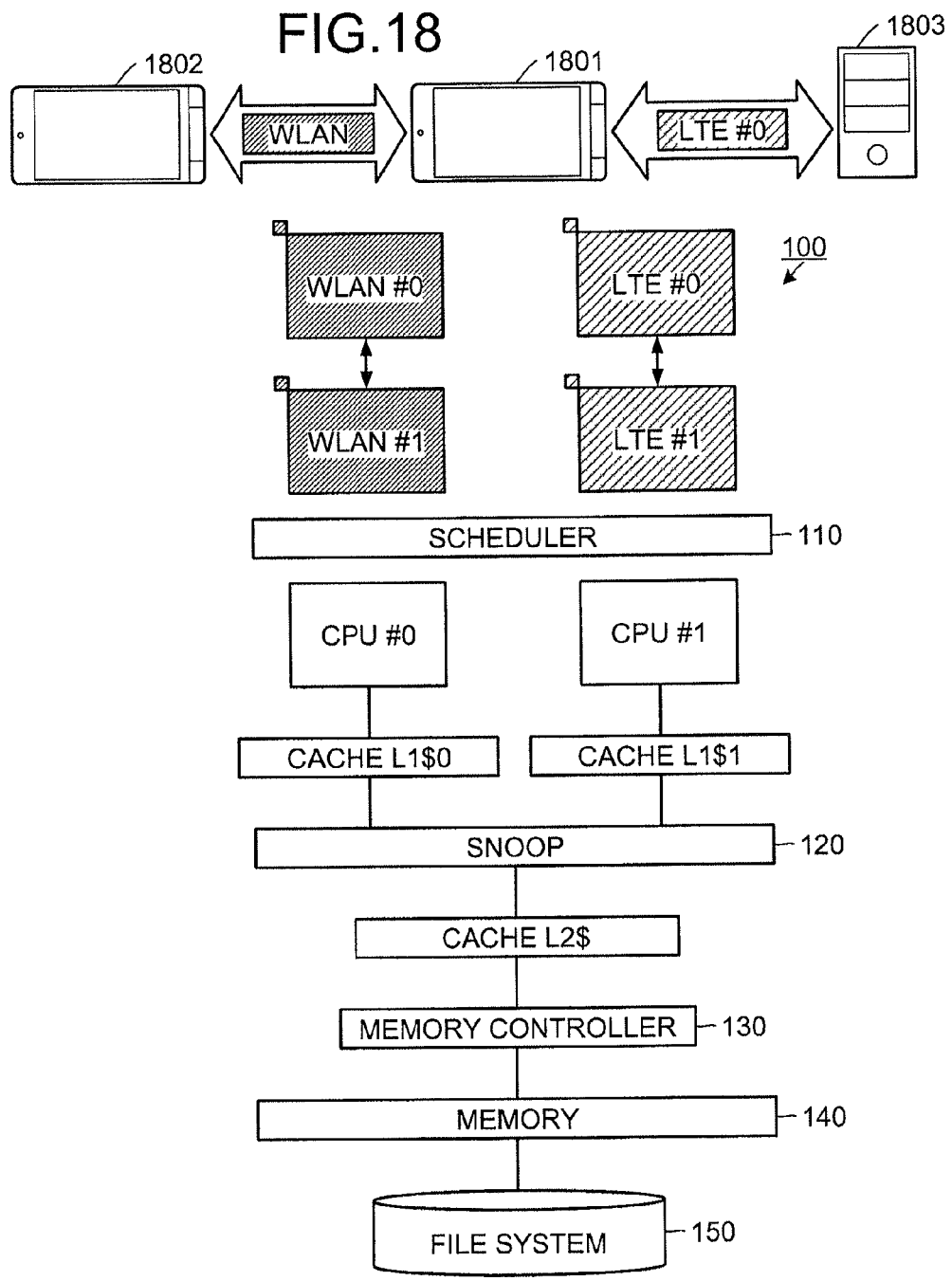

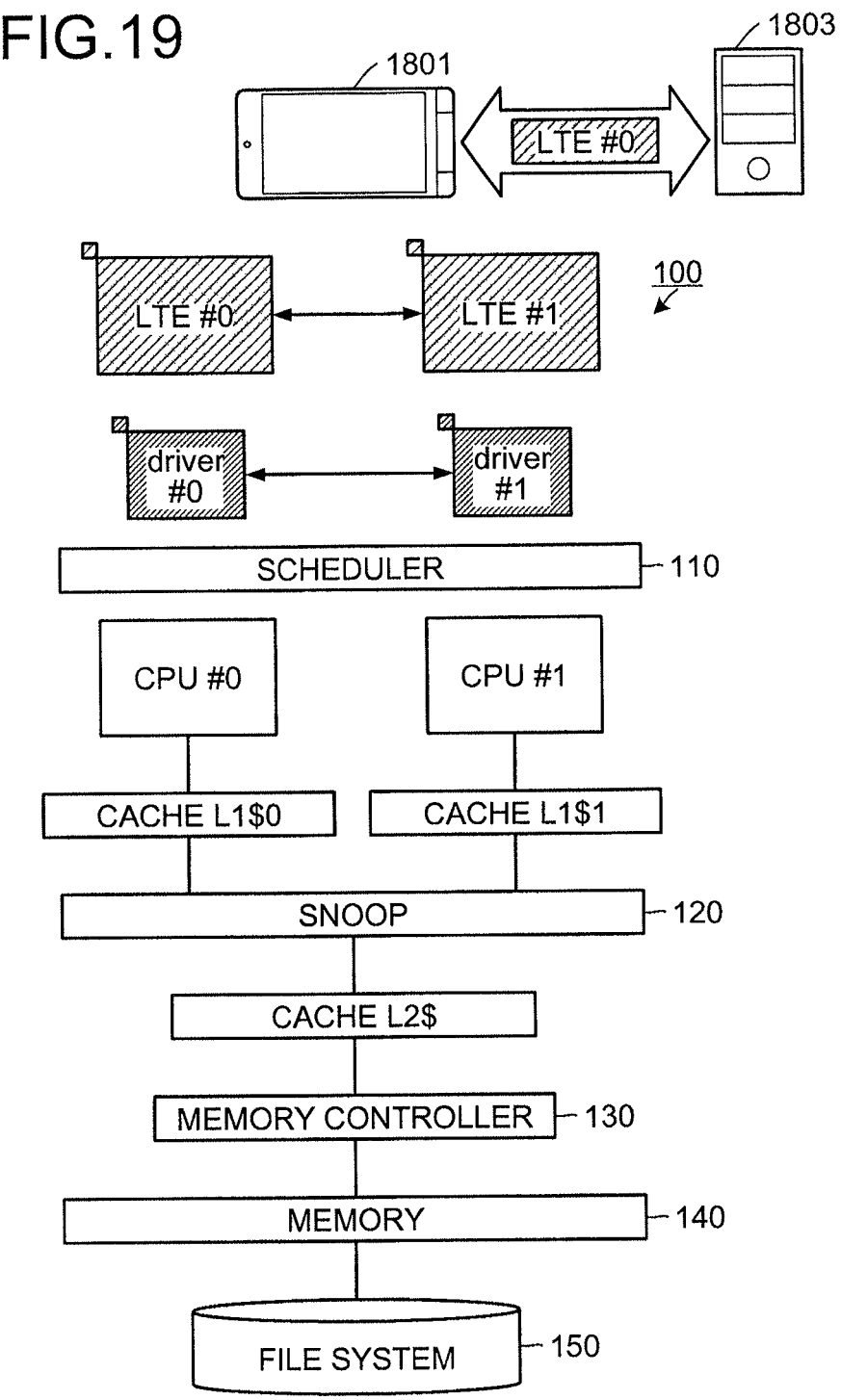

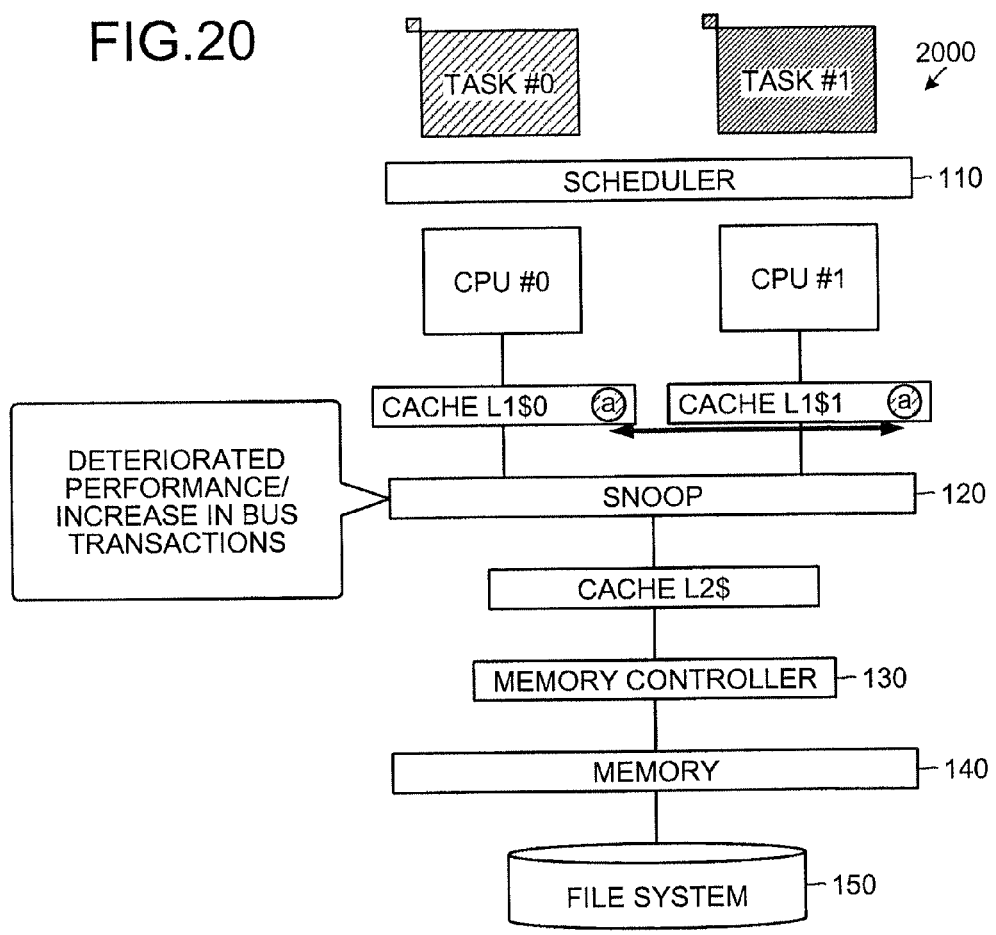

SCHEDULER, MULTI-CORE PROCESSOR SYSTEM, AND SCHEDULING METHOD

CROSS REFERENCE TO RELATED APPLICATIONS

This application is a continuation application of International Application PCT/JP2010/064566, filed on Aug. 27, 2010 and designating the U.S., the entire contents of which are incorporated herein by reference.

FIELD

The embodiments discussed herein are related to a scheduler, a multi-core processor system, and a scheduling method for executing multi-task processing through parallel processing by multiple cores.

BACKGROUND

Conventionally, a hierarchical memory configuration composed of a cache memory, a main memory, and a file system has been adopted as a memory area in which data used by a core when executing a process is stored. Because the hierarchical memory configuration improves data access speed, the system can be expected to operate faster. In the hierarchical memory configuration, a cache memory, which operates faster than other memories, has a limited memory capacity. For this reason, data stored in the cache memory is replaced using a least recently used (LRU) algorithm, etc. (see, e.g., Japanese Laid-Open Patent Application No. H6-175923).

A multi-core processor system having multiple cores is in wide use in recent years. The multi-core processor system causes the cores to execute tasks in parallel and thereby, significantly improves processing performance (see, e.g., Japanese Laid-Open Patent Application No. H6-175923). In parallel execution of tasks by the multi-core processor system, however, when data on the cache memory of each core is rewritten, a process of synchronizing the written data with data on the cache memory of another core is required.

One method of data synchronization is, for example, a snoop cache mechanism that is a mechanism for establishing cache coherence between cores. The snoop cache mechanism is actuated when data is rewritten that is on the cache memory of a given core and is share by another core. Rewriting data on the cache memory is detected by a snoop controller incorporated in the cache memory of another core. Through a bus between cache memories, the snoop controller reflects a new value resulting from the data rewriting in the cache memory of the other core (see, e.g., Japanese Laid-Open Patent Application No. H10-240698).

An embedded system requires parallel execution of multiple applications. Hence, techniques for realizing parallel execution have been provided. Such techniques are disclosed as, for example, multi-task processing of switching a task executed at one core by time sharing, etc., a distributed process of causing multiple cores to execute multiple tasks, and a process given by combining these processes together (see, e.g., Japanese Laid-Open Patent Application No. H11-212869).

In the case of the multi-core processor system, however, the execution of parallel tasks by multiple cores requires synchronization between cache memories and the execution of multi-task processing results in frequent rewriting of a cache memory. Such cache memory synchronization and rewriting often cause the performance of the system to drop.

FIG. 20 is an explanatory diagram of an example of an operation of a snoop in multi-core parallel processing. In a multi-core processor system 2000, multiple cores (e.g., CPU #0 and CPU #1 in FIG. 20) execute parallel processing in which the CPUs execute processes simultaneously. In the execution of parallel processing, when the CPUs simultaneously execute tasks using common data, if the data on one cache memory (e.g., either a cache L1$0 or a cache L1$1) is rewritten, a snoop 120 performs a synchronization process. For example, when the CPU #0 rewrites a value for variable a in data stored in the cache L1$0, the snoop 120 rewrites a value for variable a in the cache L1$1 via a bus.

If data rewriting by the snoop 120 occurs frequently, the bus connecting the cache L1$0 to the cache L1$1 becomes congested, which leads to a drop in system performance. In addition, frequent data rewriting increases bus transactions, causing the bus of the snoop 120 to be occupied. Under such conditions, when a request for executing a different process with a real-time constraint is issued, the condition hampers access by the process with the real-time constraint to the cache memory of the process, which could develop into a serious performance-related problem.

FIG. 21 is an explanatory diagram of an example of cache rewriting in multi-task processing. When the multi-core processor system 2000 executes multi-task processing, the multi-core processor system 2000 performs task switching of switching a task to be executed, depending on a condition of executing of tasks. For example, in FIG. 21, the multi-core processor system 2000 executes multi-task processing on tasks #0 to #2.

It is assumed that task switching occurs in a state where the CPU #0 executes the task #0 and the CPU #1 executes the task #2, as depicted on the left in FIG. 21. As a result of the task switching, the task to be executed by the CPU #0 is changed from the task #0 to the task #1, as depicted on the right in FIG. 21. When the task to be executed is switched, data that is stored in the cache L1$0 and used by the task #0, is rewritten into data used by the task #1.

After the data stored in the cache L1$0 is rewritten, if a process that has been executed before the data rewriting is resumed, the CPU #0 must again read from memory 140, the data to be used. Even when data stored in the cache memory of a task-executing CPU is rewritten as a result of task switching, the rewritten data is not used by the CPU in many cases. The rewriting of data that is not subsequently used poses a problem in that the data rewriting causes a drop in the performance of the CPU using the cache memory.

SUMMARY

According to an aspect of an embodiment, a scheduler causes a given core in a multi-core processor to execute processing that includes determining if a priority level of a process that is to be executed and among a group of processes assigned to and executed by cores of the multi-core processor is greater than or equal to a threshold; saving to a cache memory of each core that executes among processes to be executed, a high-priority process for which the priority level has been determined to be greater than or equal to the threshold, data that is accessed by the high-priority process upon execution; saving to a memory area different from the cache memory and to which access is slower than access to the cache memory, data that is accessed by a low-priority process for which the priority level has been determined to not be greater than or equal to the threshold; and saving the data saved in the memory area, to a cache memory of a requesting core in the multi-core processor, when the requesting core issues an access request for the data saved in the memory area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a flowchart of a procedure of a shared data saving process;

FIG. 11 is a flowchart of a procedure of a task table making process;

FIG. 12 is a data table depicting an example of the data structure of a task table;

FIG. 13 is a data table depicting an example of setting of the task table;

FIGS. 14, 15, 16, and 17 are flowcharts of a procedure of a task execution process;

FIG. 18 is an explanatory diagram of an example of execution of parallel tasks having the same priority level;

FIG. 19 is an explanatory diagram of an example of execution of parallel tasks having differing priority levels;

FIG. 20 is an explanatory diagram of an example of an operation of a snoop in multi-core parallel processing.

DESCRIPTION OF EMBODIMENTS

Preferred embodiments of the present invention will be explained with reference to the accompanying drawings.

Figure 1:
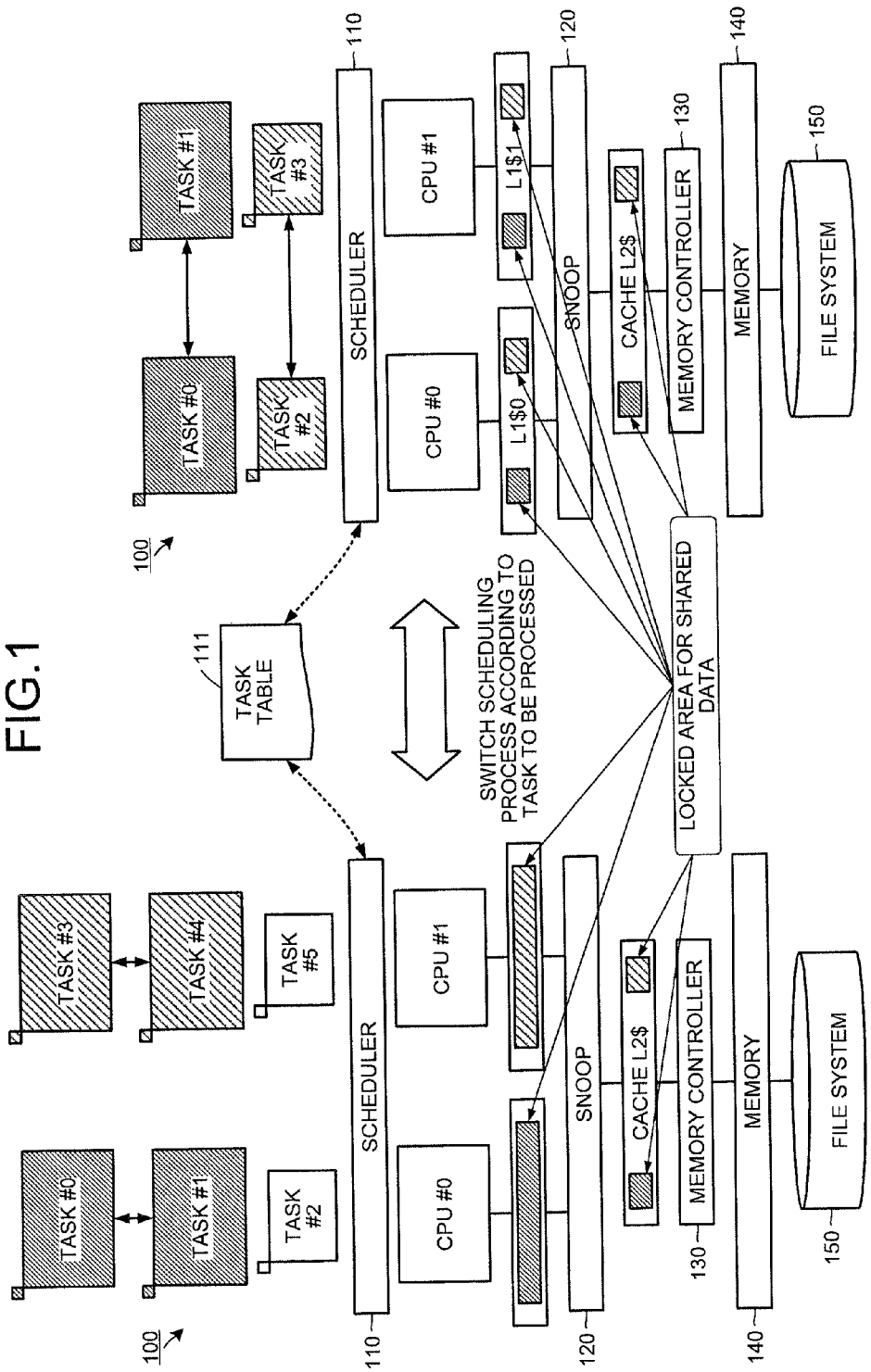
FIG. 1 is an explanatory diagram of an example of a scheduling process according to an embodiment.

FIG. 1 is an explanatory diagram of an example of a scheduling process according to an embodiment. According to the embodiment, multiple processes can be executed in parallel by multiple cores incorporated in a multi-core processor system 100. The multi-core processor system 100 extracts from applications, a group of processes that can be executed in parallel (e.g., parallel tasks) to execute efficient parallel processing.

According to the embodiment, a priority level concerning execution order is set on a process to be executed to give the process high priority or low priority for execution. By doing this, data that is frequently used can be selected and is saved to a cache memory. The priority level of a process is set based on the frequency at which the process accesses data stored temporarily in the cache memory when the process is executed and is based on a deadline time for the process. The set priority levels of tasks are stored in a task table 111. In the drawings starting from FIG. 1, a block representing a high-priority task is depicted as a block larger than a block representing a low-priority task.

The scheduler 110 of the multi-core processor system 100, therefore, checks priority levels given to processes to be executed in parallel and stores each data that is accessed when each process is executed (hereinafter "shared data") in an optimum memory area. When the same shared data is stored in multiple cache memories, the scheduler 110 selects a method of establishing cache coherency for synchronizing the shared data according to priority levels.

For example, in the case of the multi-core processor system 100 depicted on the left where CPUs simultaneously execute, in parallel, executable processes given the same priority level, the scheduler 110 preferentially saves to a memory area accessed at higher speed, shared data for a high-priority process. For example, shared data for tasks #0 and 1 and tasks #3 and 4, which can be executed in parallel and are given high priority levels, is saved to memory areas accessed at higher speed, in descending order of speed, where a cache L1$ is first to receive the data. Shared data for tasks #2 and #5 having low priority levels is saved to the remaining portions of the memory areas after the shared data for the high-priority process is stored.

In the case of the multi-core processor system 100 depicted on the right where CPUs simultaneously execute, in parallel, processes having different priority levels, the scheduler 110 preferentially saves to the cache L1$, shared data for a process given a high priority level as the multi-core processor system 100 on the left does. The scheduler 110 then saves to the remaining portions of the memory areas, shared data for the tasks #2 and #3 having low priority levels.

In the multi-core processor system 100 on the left, the scheduler 110 performs cache coherency at a point of time when a new value is written to an ordinary cache memory. In the multi-core processor system 100 depicted on the right, in contrast, the scheduler 110 performs cache coherency at a point of time when, after a new value is written to a given cache memory (e.g., cache L1$0) and the CPU accesses a cache memory (cache L1$1) to which the new value is not written to read data.

In this manner, the multi-core processor system 100 of the embodiment preferentially saves to a cache memory accessed at high speed, shared data having a frequency of use and thereby, improves processing speed. Synchronization of shared data for a process given a low priority level through cache coherency is postponed until the CPU makes an access request. As a result, operation that causes processing performance to drop, such as writing shared data that is not subsequently used again into the cache memory, can be avoided. A detailed configuration and a procedure of the multi-core processor system 100 according to the embodiment will be described.

Figure 2:
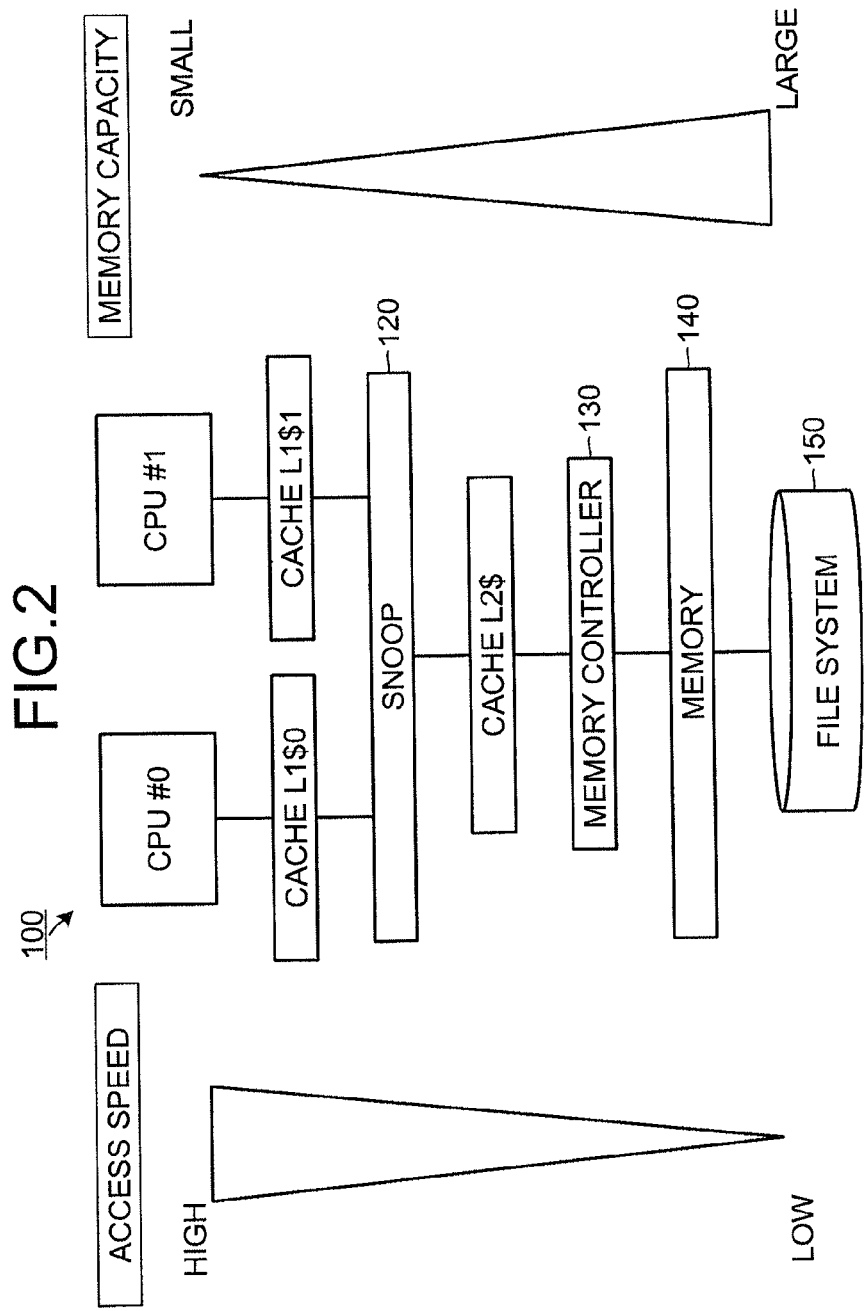
FIG. 2 is an explanatory diagram of an example of a hierarchical memory configuration.

FIG. 2 is an explanatory diagram of an example of a hierarchical memory configuration. As depicted in FIG. 2, the multi-core processor system 100 of the embodiment includes multiple types of memory areas. Because these memory areas differ in speed of access by a core and memory capacity, use-dependent data is stored in each memory area.

As depicted in FIG. 2, four types of memory areas are provided for each core (CPU #0, CPU #1) of the multi-core processor system 100, the memory areas including a cache L1$ (cache memory incorporated in each core), a cache L2$ (cache memory incorporated in a snoop 120), memory 140, and a file system 150.

A high-level memory area closer in its connection to each core is accessed at higher speed and has a smaller capacity. In contrast, a low-level memory area distant in its connection from each core is accessed at lower speed and has a larger capacity. Hence, the multi-core processor system 100, as depicted in FIG. 1, preferentially stores shared data used by a task to be processed and frequently used shared data in high-level memory.

Figure 3:
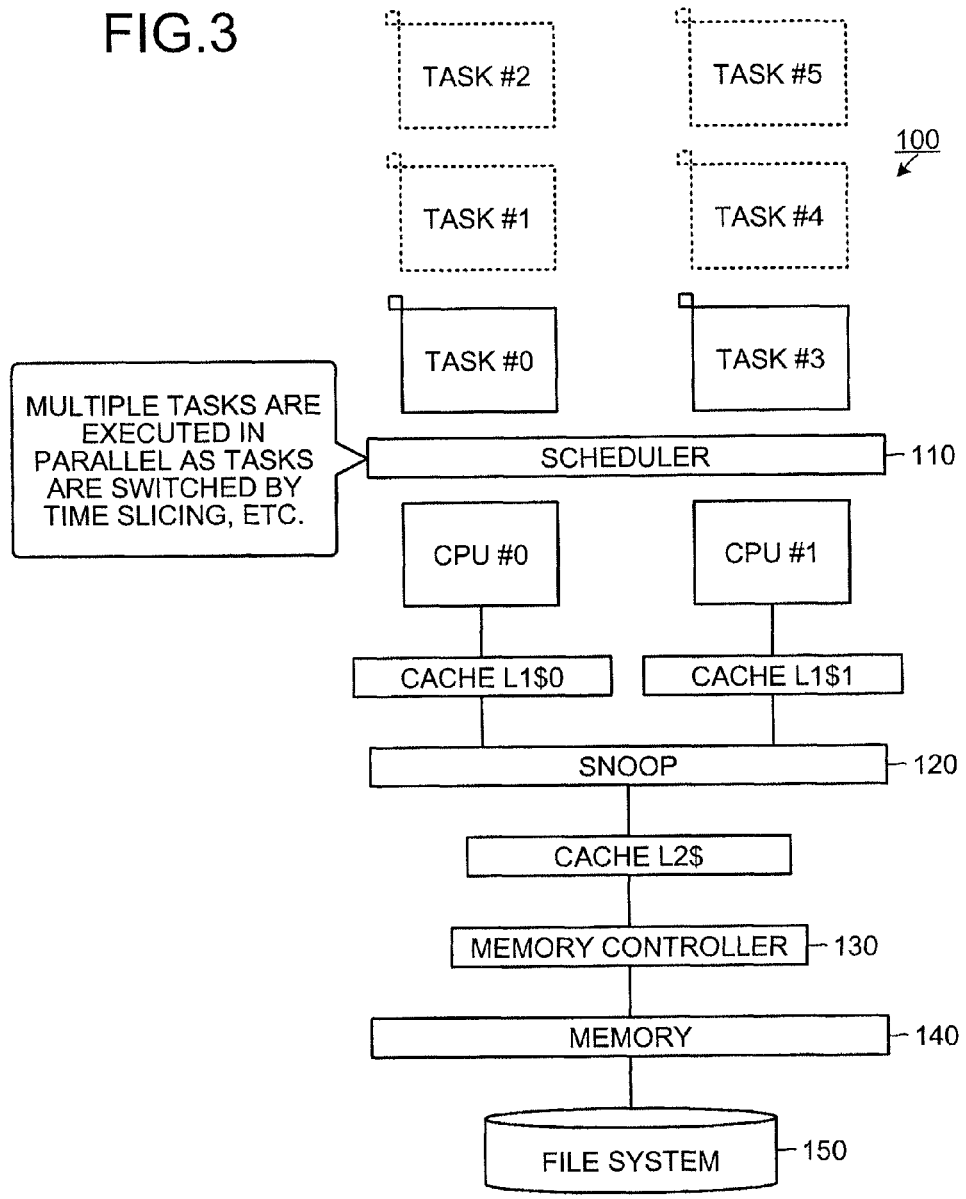
FIG. 3 is an explanatory diagram of an example of multi-task processing.
Figure 4:
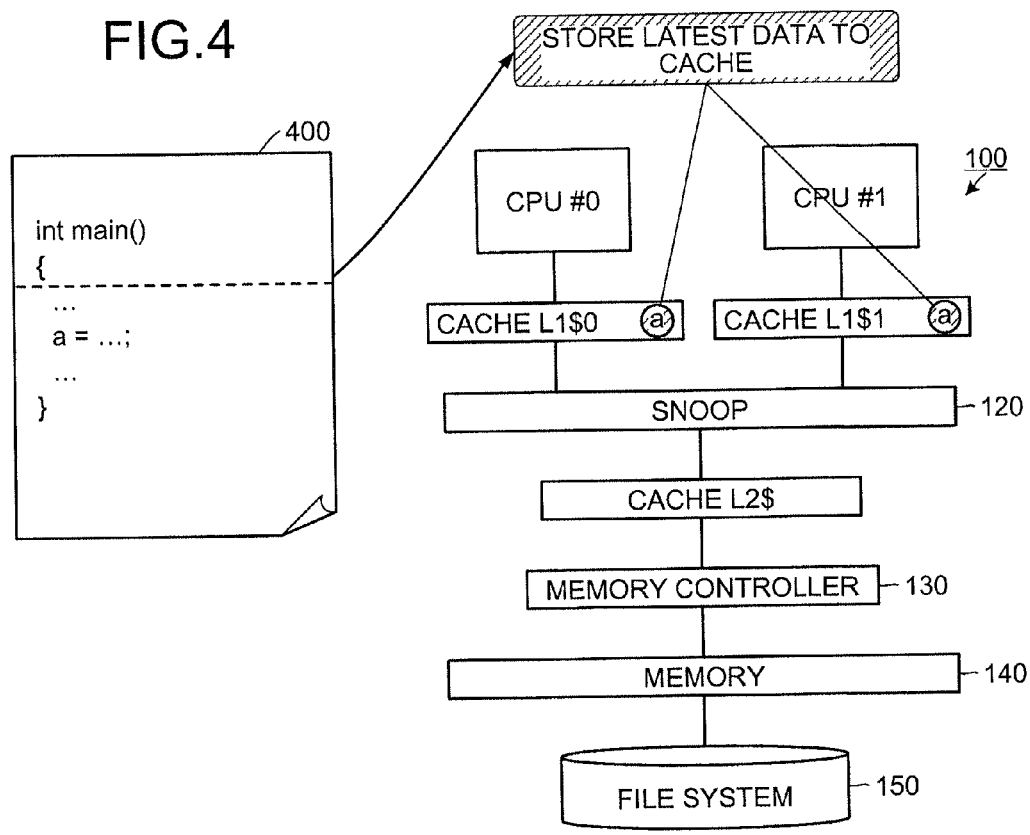
FIGS. 4, 5, 6, and 7 are explanatory diagrams of a procedure of ordinary cache coherency.

FIG. 3 is an explanatory diagram of an example of multi-task processing. The multi-task processing by the multi-core processor system 100 of the embodiment means processing where multiple cores execute multiple tasks in parallel.

For example, in FIG. 3, tasks #0 to #5 are provided as tasks to be executed by the multi-core processor system 100. Under the control of the scheduler 110, the CPUs #0 and #1 each execute a dispatched task. The scheduler 110 properly switches, via time slicing, etc., a task that is to be executed and extracted from among multiple tasks, to thereby cause the CPUs to execute tasks in parallel.

A procedure of cache coherency executed by the snoop 120 of the multi-core processor system 100 will be described. As described with reference to FIG. 1, the snoop 120 sets a coherency method according to an instruction from the scheduler 110 and thus, executes either ordinary cache coherency or cache coherency for low-priority parallel tasks.

<Ordinary Cache Coherency (Updating at Writing)>

FIGS. 4, 5, 6, and 7 are explanatory diagrams of a procedure of ordinary cache coherency. According to the multi-core processor system 100 of FIG. 4, the latest data is stored to the cache memories (caches L1$0 and L1$1) of the CPUs #0 and #1 that execute parallel tasks, based on a description 400 of the task to be executed.

Figure 5:
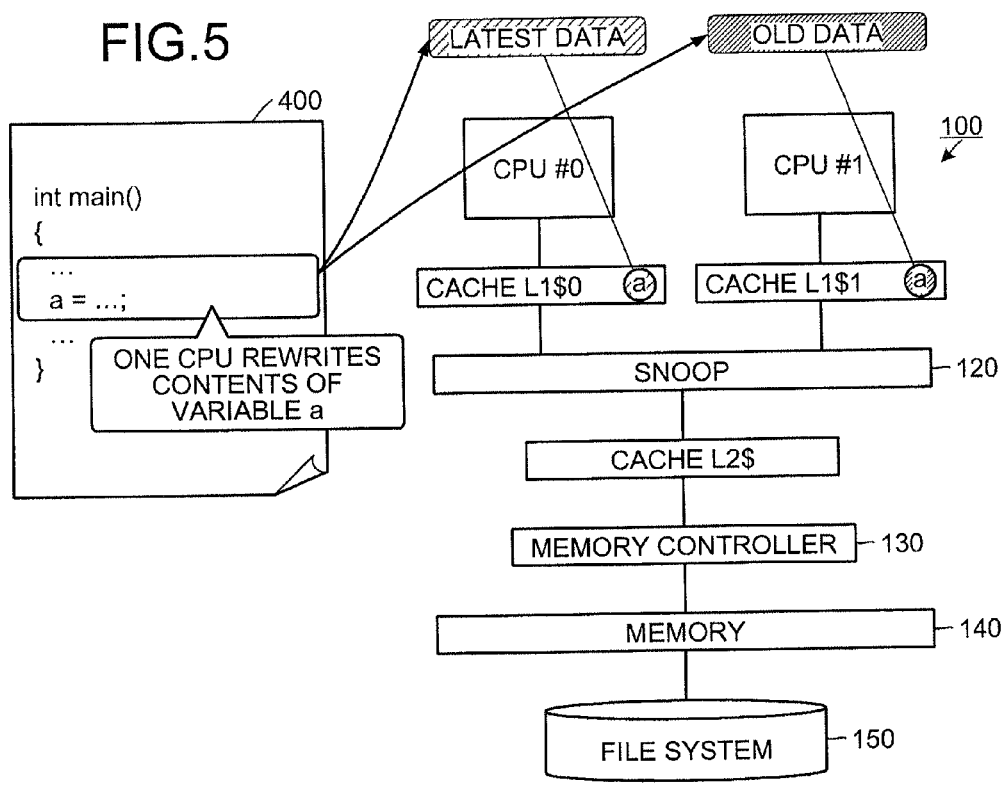

It is assumed that following storage of the latest data, one CPU of the multi-core processor system 100 rewrites the contents of variable a of the description 400, as depicted in FIG. 5. For example, in FIG. 5, the CPU #0 rewrites a value for the variable a in the cache L1$0. This leaves a variable a of the same data stored in the cache L1$1, as old data, which means the same variable a in both caches represent different values.

Figure 6:
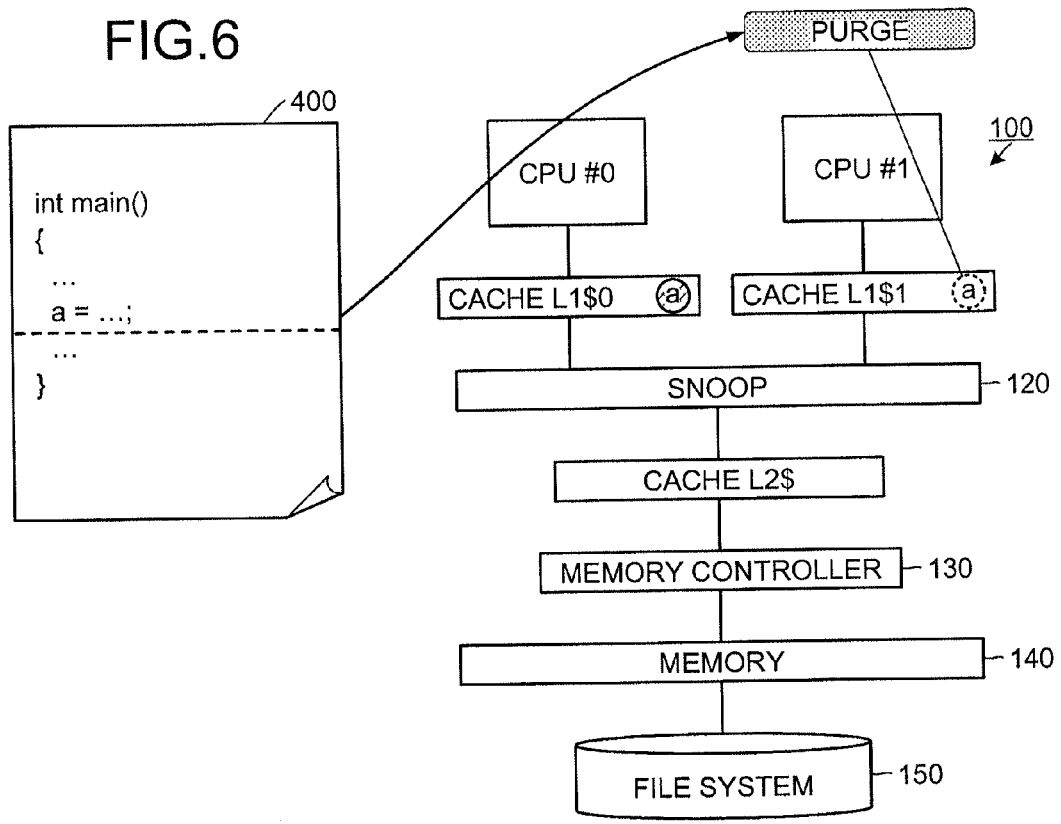

In the case of ordinary cache coherency, the value for the variable a stored in the cache L1$1 as old data is purged based on the description 400, as depicted in FIG. 6.

Figure 7:
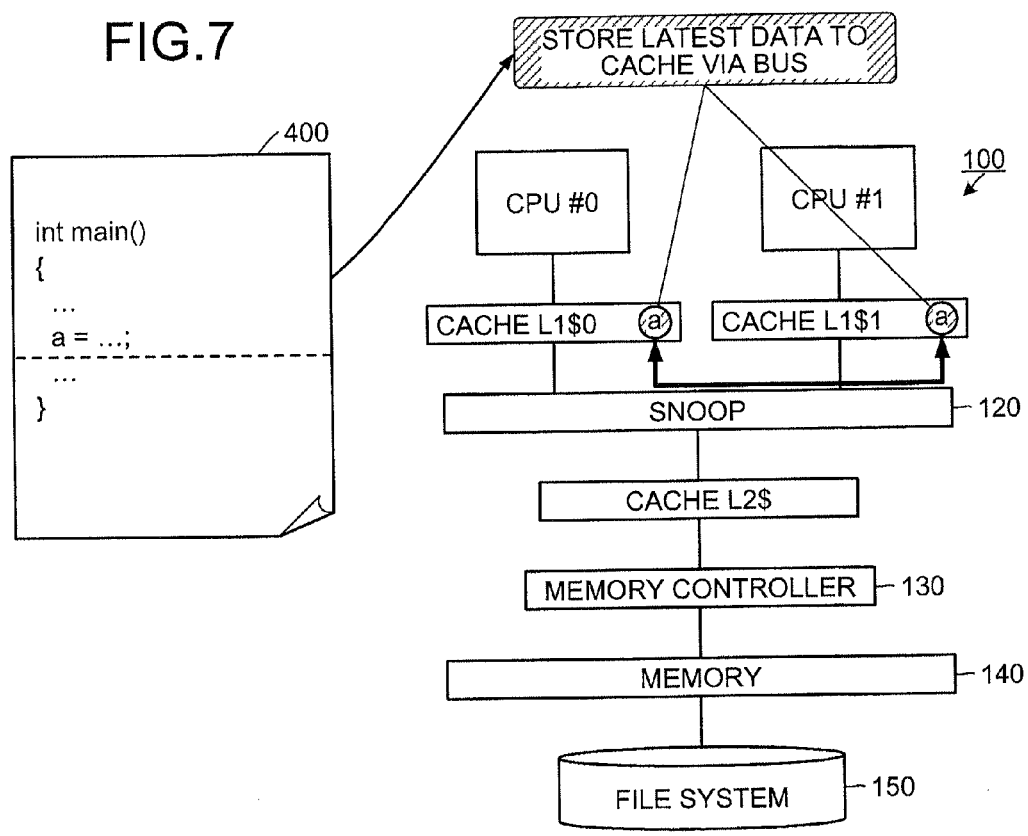

Subsequently, as depicted in FIG. 7, the value for the variable a in the cache L1$0 is stored to the cache L1$1 as the value for the variable a in the cache L1$1, through the bus of the snoop 120. As described, in the case of ordinary cache coherency, consistency between the cache L1$0 and the cache L1$1 is maintained by executing processes depicted in FIGS. 4 to 7.

<Cache Coherency for Low-Priority Parallel Task (Updating at Reading)>

Figure 8:
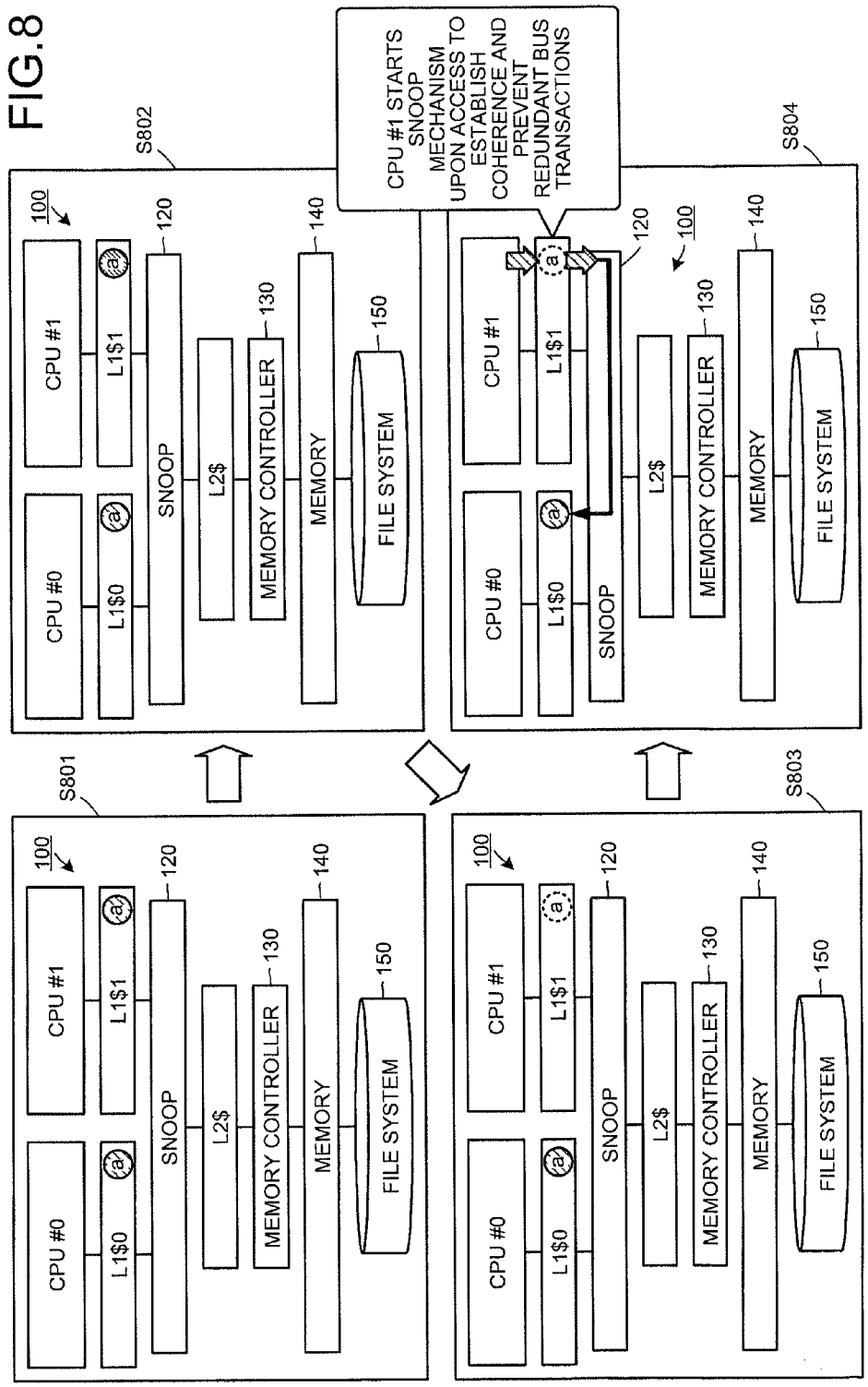
FIG. 8 is an explanatory diagram of a procedure of cache coherency for a low-priority parallel task.

FIG. 8 is an explanatory diagram of a procedure of cache coherency for a low-priority parallel task. FIG. 8 depicts a procedure of coherency that is performed when the multi-core processor system 100 executes parallel tasks given a low priority level.

In the multi-core processor system 100, the CPU #0 and the CPU #1 execute parallel tasks and the same data is saved to the cache L1$0 and the cache L1$1 (step S801).

When the CPU #0 of the multi-core processor system 100 rewrites the contents of the variable a (step S802), the variable a in the cache L1$1 is purged (step S803). In this manner, the procedure of cache coherency for low-priority parallel tasks is the same as the procedure of ordinary cache coherency in terms of detecting the rewriting of the variable a stored in the cache memory and purging old data.

Subsequently, when the CPU #1 of the multi-core processor system 100 executes a process of accessing the variable a, the snoop 120 saves to the cache L1$1 through the bus, the latest value for the variable a stored in the cache L1$0 (step S804).

As described, according to cache coherency for a low-priority parallel task, when a request is made for access of the variable a in the cache L1$1 in which the latest rewritten contents is not reflected by the CPU #1, the snoop 120 is controlled to establish cache coherency, thereby preventing redundant bus transactions that occur in ordinary cache coherency.

As described, in ordinary cache coherency, a coherency action is started at the time of updating of the variable a. In cache coherency for a low-priority parallel task, however, a coherency action is started at the time when the CPU #1 makes a request to read the variable a after the CPU #0 updates the variable a in the cache L1$0. For example, the snoop 120 reads the value for the variable a that is the latest variable in the cache L1$0 and saves to the cache L1$1, the read value as the value for the variable a.

At step S804 of FIG. 8, data to be accessed by the CPU #0 is saved to the cache L1$0. Depending on the task to be executed using the cache L1$0, however, data stored in a memory area other than the cache L1$0 may be accessed. For example, a case may be assumed where the CPU #0 accesses data stored in the cache L2$, the memory 140, or the file system 150. In such a case, the snoop 120 reads from each data area, data to be accessed and saves the read data to the cache memory L1$.

A functional configuration and operation details of the scheduler 110 of the multi-core processor system 100 that realizes the scheduling process of the embodiment depicted in FIG. 1 will be described.

Figure 9:
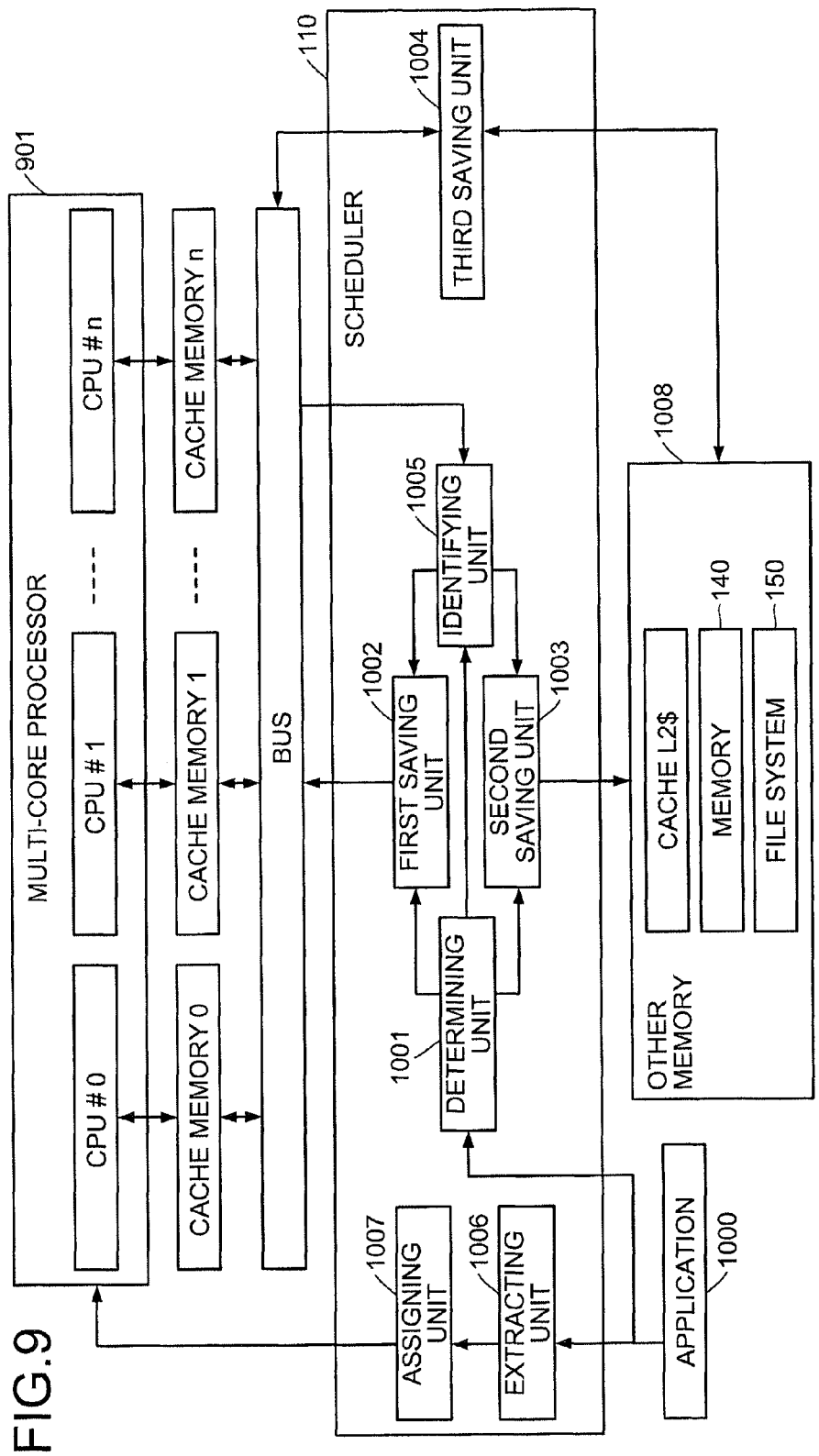
FIG. 9 is a block diagram of a functional configuration of a scheduler.
Figure 21:
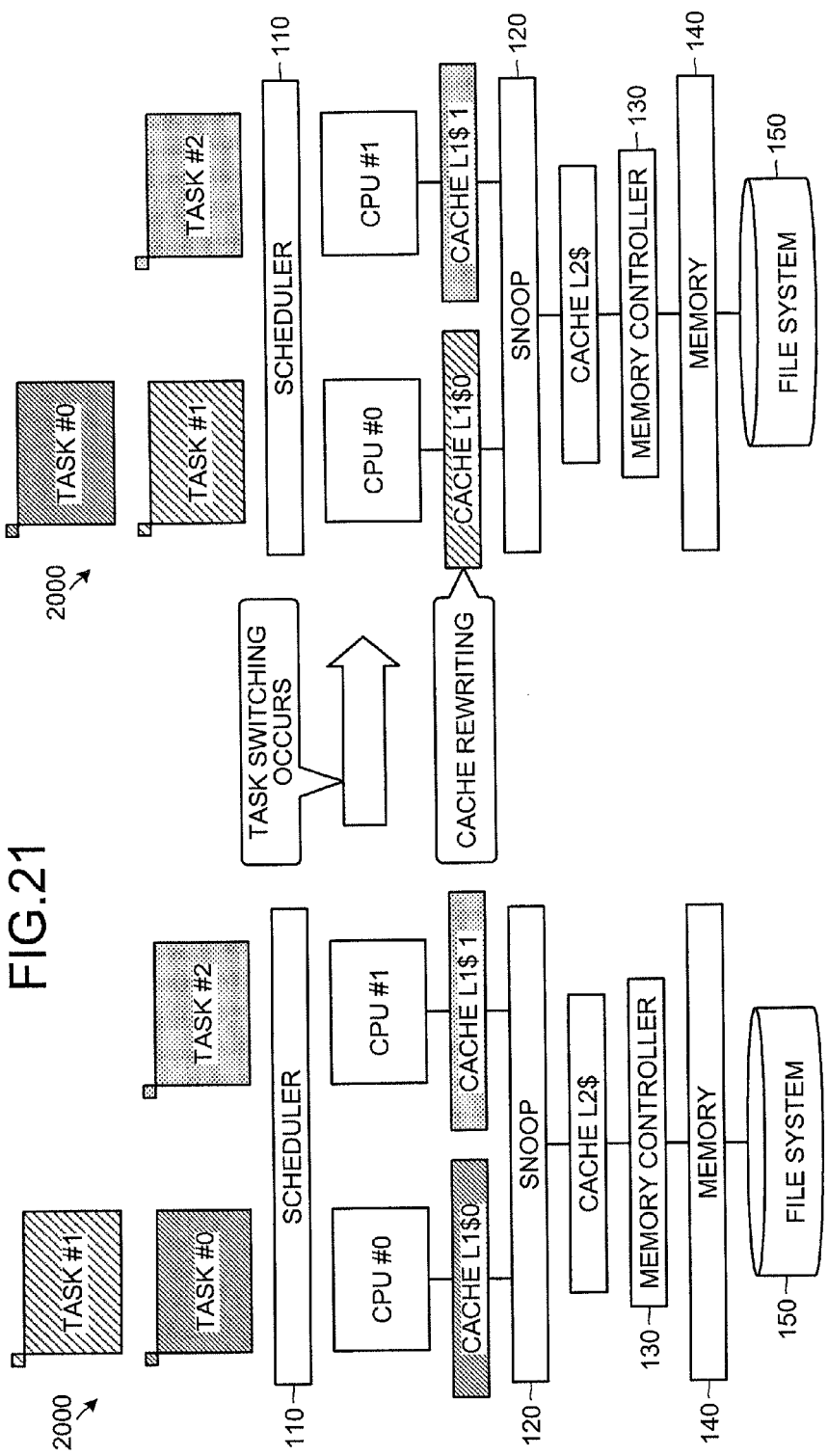
FIG. 21 is an explanatory diagram of an example of cache rewriting in multi-task processing.

FIG. 9 is a block diagram of a functional configuration of the scheduler. In FIG. 9, a multi-core processor 901 has n central processing units (CPUs), and performs overall control over the multi-core processor system 100. The multi-core processor 901 is a processor equipped with multiple cores or is a group of cores. The multi-core processor 901 may be provided as a single processor equipped with multiple cores or as a group of single core processors in parallel. Both forms of multi-cores are applicable as long as multiple cores are provided. In this embodiment, for simpler description, a group of single core processors in parallel is described as an example.

The scheduler 110 includes a determining unit 1001, a first saving unit 1002, a second saving unit 1003, a third saving unit 1004, an identifying unit 1005, an extracting unit 1006, and an assigning unit 1007. The functions of the determining unit 1001 to the assigning unit 1007 are realized, for example, by causing a given CPU in the multi-core processor 901 to execute programs stored in other memory 1008 (memory other than the cache memory of the CPU) of the multi-core processor system 100.

The determining unit 1001 has a function of determining if the priority level of a process to be executed (hereinafter "given process") is greater than or equal to a threshold in the multi-core processor system 100. For example, the determining unit 1001 determines if the priority level of a given process assigned to each core and among a group of processes to be assigned for execution to cores (CPU #0 to CPU #n) of the multi-core processor system 100 is greater than or equal to the threshold. The result of determination by the determining unit 1001 is stored temporarily in a memory area, such as the other memory 1008.

A priority level is set based on an operation result acquired by a simulation of the given process. For example, a priority level may be set in such a way that deadlines for given processes are compared with each other and the process having a shorter time to the deadline is given higher priority. The scheduler 110 of the embodiment temporarily saves shared data for a given process given a high priority level to memory accessed at high speed (cache L1$ or cache L2$), and then keeps the data locked until the process is completed. The given process having a high priority level is, therefore, executed preferentially over other given processes.

A priority level may be set in another way, referring to an operation result, such that a given process that updates shared data saved to the cache memory at a higher frequency is given higher priority. The scheduler 110 of the embodiment preferentially saves share data that is frequently used to the cache memory (cache L1$) of each core and thereby, keeps the utilization efficiency of the cache memory high.

The threshold used as a criterion by the determining unit 1001 can be adjusted. The determining unit 1001 determines a given process to be a high-priority when the priority level given to the given process is greater than or equal to a threshold, and determines a given process to be a low-priority when the priority level given to the given process is less than the threshold. An optimum threshold, therefore, can be set according to the application to be executed. A unit of a given process may be selected arbitrarily as a task, process, or thread. In the embodiment, a task is described as an example of a unit of a given process.

The first saving unit 1002 has a function of saving data to the cache memory of each CPU according to the result of determination by the determining unit 1001. For example, the saving unit 1002 saves to the cache memory of a process-executing CPU, shared data accessed by a high-priority process among given processes, the high-priority process being a process for which the priority level is determined by the determining unit 1001 to be greater than or equal to the threshold.

For example, when a task A, which is a high-priority process, is executed by the CPU #1 in the multi-core processor 901, the first saving unit 1002 saves to the cache memory 1, shared data accessed by the task A at execution thereof. In the same manner, when a task B, which is a high-priority process, is executed by the CPU #0 in the multi-core processor 901, the first saving unit 1002 saves to the cache memory 0, shared data accessed by the task B at execution thereof.

According to the type of an application 1000, the determining unit 1001 may determine that a high-priority process is not present among given processes. If the cache memory is left empty in such a case, the utilization efficiency of the cache memory declines. To prevent this, the first saving unit 1002 saves shared data to the cache memory of each CPU even if the shared data is to be accessed by a process other than a high-priority process (e.g., low-priority process, which will be described later). When a high-priority process is found, the saving unit 1002 preferentially saves shared data for the high-priority process to the cache memory of a process-executing CPU.

As described, when the first saving unit 1002 saves shared data for a high-priority process to the cache memory of a process-executing core, the first saving unit 1002 may prohibit overwriting of the shared data (put the shared data in a locked state) until execution of the high-priority process is completed. Hence, the first saving unit 1002 prevents the overwriting of shared data for a high-priority process with data that is not subsequently used again.

The second saving unit 1003 has a function of saving based on the result of determination by the determining unit 1001, data to the other memory 1008 to which access is slower than access to the cache memory of each core. For example, the second saving unit 1003 saves to the other memory 1008, shared data accessed by a low-priority process at execution thereof, the low-priority process being a process for which the priority level is determined by the determining unit 1001 to not be greater than or equal to the threshold.

As depicted in FIG. 2, the other memory 1008 other than the cache memory is made up of multiple types of memories hierarchical according to differences in access speed and memory capacity. The second saving unit 1003, therefore, saves to the memories in descending order of access speed, data of a volume that can be saved to the respective memory, where memory accessed at a higher speed is first to receive the data. For example, in the case of FIG. 9, data is saved to the cache L2$, the memory 140, and the file system 150 in this order. Data with high updating frequency identified by pre-simulation is saved preferentially to memory accessed at high speed.

The third saving unit 1004 has a function of saving shared data for which access is requested by the multi-core processor 901, to the cache memory of a CPU having made the access request. For example, when any one of the CPUs included in the multi-core processor 901 (e.g., CPU #1) makes a request for access of shared data stored in the memory 1008, the third saving unit 1004 saves the shared data stored in the memory 1008, to the cache memory 1 of the CPU #1.

The identifying unit 1005 has a function of identifying the capacity of a rewritable area in the cache memory of each CPU of the multi-core processor 901 when the determining unit 1001 makes the determination of if the priority level of a given process is greater than or equal to the threshold. A rewritable area means an area that can be overwritten.

In an area in which shared data for a completed process is saved and an area in which shared data for a low-priority process is saved, the data can be overwritten. These areas, therefore, are identified as rewritable areas. The result of identification by the identifying unit 1005 is stored temporarily in a memory area, such as the other memory 1008.

The first saving unit 1002 can adjust its saving process according to the capacity of the rewritable area identified by the identifying unit 1005. For example, if the capacity of the rewritable area is smaller than the volume of shared data accessed by a high-priority process at execution thereof, the first saving unit 1002 cannot save all of the shared data to the cache memory. For this reason, the first saving unit 1002 saves to the cache memory in descending order of updating frequency, shared data of a volume that can be stored to the cache memory. The second saving unit 1003 saves to the other memory 1008, the rest of the shared data not stored to the cache memory.

In contrast, the capacity of a rewritable area may be larger than the volume of shared data accessed by a high-priority process at execution thereof. In such a case, the first saving unit 1002 first saves the shared data accessed by the high-priority process at execution thereof, to the cache memory in an ordinary manner. The first saving unit 1002 then saves to a vacant area in the cache memory, in descending order of updating frequency, a portion of shared data accessed by a low-priority process at execution thereof.

The extracting unit 1006 has a function of extracting from among given processes included in the application 1000, a process meeting a specific condition. For example, from among the given processes, the extracting unit 1006 extracts a process that accesses common data at execution thereof (e.g., parallel task). Whether the process accesses common data at execution thereof is determined by checking an identifier for shared data and set for each given process (e.g., shared data ID that will be described later with reference to FIG. 13). The result of extraction by the extracting unit 1006 is stored temporarily to a memory area, such as the memory 1008.

The assigning unit 1007 has a function of assigning a given process to the CPUs of the multi-core processor 901. When receiving no instruction from the scheduler 110, the assigning unit 1007 assigns each given process to an optimal CPU, based on a preset dependency relation and execution order, and based on the process load of each CPU.

When a process extracted by the extracting unit 1006 is present, the assigning unit 1007 assigns each process extracted as a process that accesses common shared data, to the same CPU in the multi-core processor 901. The assigning unit 1007 may assign processes given the same priority level among processes extracted by the extracting unit 1006, to the same CPU (e.g., CPU #1) in the multi-core processor 901.

A case will be described where the multi-core processor 100 causes each CPU to execute, in parallel, parallel tasks making up the application 1000 as an example of a given process.

FIG. 10 is a flowchart of a procedure of a shared data saving process. The flowchart of FIG. 10 depicts a procedure of determining to which cache memory (cache L1$ or cache L2$) shared data is to be saved. By executing each of the steps in FIG. 10, shared data used when each task is executed can be saved to a proper cache memory corresponding to the contents of a cache coherency process.

In FIG. 10, tasks to be executed are input sequentially to the scheduler 110. The scheduler 110, therefore, determines whether a task to be executed is a high-priority task (step 1001). When determining at step S1001 that the task to be executed is a high-priority task (step 1001: YES), the scheduler 110 determines whether the total size of all the shared data for the task to be executed is smaller than the size of the cache L1$ (step S1002).

When determining at step S1002 that the total size of all the shared data is smaller than the size of the cache L1$ (step S1002: YES), the scheduler 110 saves all the shared data to the cache L1$ (step S1003), and ends the series of operations. At step S1003, when the task to be executed is a high-priority task and all the shared data for the task to be executed can be stored to the cache memory of the CPU, the scheduler 110 saves all the shared data to the cache L1$ accessed at high speed.

When determining at step S1002 that the total size of all the shared data is not smaller than the size of the cache L1$ (step S1002: NO), the scheduler 110 cannot save all the shared data to the cache L1$. The scheduler 110, therefore, saves the shared data for the task to be executed, to the cache L1$ and the cache L2$ in descending order of updating frequency (step S1004). In other words, at step S1004, the scheduler 110 first saves a portion of the shared data to the cache L1$ in descending order of updating frequency, and when the cache L1$ runs out of vacant areas, the scheduler 110 saves the remaining portion of the shared data to the cache L2$ in descending order of updating frequency.

The operations at steps S1002 to S1004 described above represent a procedure of saving shared data for a high-priority task. Shared data for a task other than a high-priority task (low-priority task) that is updated at a greater frequency is saved to a vacant area in the cache L1$.

When determining at step S1001 that the task to be executed is not a high-priority task (step 1001: NO), the scheduler 110 executes the saving process with respect to data having a high updating frequency among the shared data. The scheduler 110 thus determines whether the total size of all the data having a high updating frequency among the shared data for the task to be executed is smaller than the size of an unlocked portion of the cache L1$ (step S1005). The size of an unlocked portion of the cache L1$ means the capacity of an area other than a locked area occupied with shared data for another task to be executed, in the cache L1$.

When determining at step S1005 that the total size of all the data having a high updating frequency is smaller than the size of the unlocked portion of the cache L1$ (step S1005: YES), the scheduler 110 determines that all the data having a high updating frequency can be saved to the cache L1$. The scheduler 110, therefore, saves all the data having a high updating frequency to the cache L1$ (step S1006), and ends the series of operations.

When determining that the total size of all the data having a high updating frequency is not smaller than the size of the unlocked portion of the cache L1$ (step S1005: NO), the scheduler 110 cannot save all the data having a high updating frequency to the cache L1$. The scheduler 110 thus saves a portion of the shared data for the task to be executed to the cache L1$ and to the cache L2$ in descending order of updating frequency (step S1007). In other words, in the same manner of data saving at step S1004, the scheduler 110 first saves a portion of the shared data to the cache L1$ in descending order of updating frequency. When the cache L1$ runs out of vacant areas, the scheduler 110 then saves the remaining portion of the shared data to the cache L2$ in descending order of updating frequency.

As described, in handling shared data for a low-priority task, the scheduler 110 can efficiently save the shared data for the low-priority task to a memory area that is not occupied with shared data for a high-priority task. When the shared data for the low-priority task is saved to a memory area accessed at high speed (e.g., cache L1$), the shared data for the low-priority task is not locked, contrary to the case of saving shared data for a high-priority task to such a memory area. Thus, a situation where the shared data for the low-priority task hampers processing of a high-priority task is prevented.

FIG. 11 is a flowchart of a procedure of a task table making process. The flowchart of FIG. 11 represents a procedure of simulating tasks making up an application executed by the multi-core processor system 100 and making a task table 111 indicating the priority levels of the tasks, based on simulation results. By executing each of the steps of FIG. 11, the scheduler 110 can make the task table 111 necessary for properly saving shared data for each task.

In FIG. 11, the scheduler 110 analyzes the size of each data in each task to be executed (step S1101). The scheduler 110 analyzes a deadline for each task (step S1102). The scheduler 110 analyzes the data-dependence between tasks (step S1103). Through the above steps S1101 to S1103, the scheduler 110 can acquire data necessary for identifying the properties of each task. Data acquired through steps S1101 to S1103 is stored to the task table 111, and is used for a simulation for setting a priority level, which will be described later.

The scheduler 110 determines whether an unsimulated parallel task is present among the tasks (step S1104). When determining at step S1104 that an unsimulated parallel task is present (step S1104: YES), the scheduler 110 executes simulation of any one set of unsimulated parallel tasks (step S1105).

Subsequently, the scheduler 110 measures the updating frequency of data having a dependent relation (step S1106), and determines whether the updating frequency of the data having a dependent relation is larger than a threshold (step S1107). Step S1107 is a process for determining whether priority level setting is necessary.

When determining at step S1107 that the updating frequency of the data having a dependent relation is larger than the threshold (step S1107: YES), the scheduler 110 sets a priority level based on a deadline listed in the task table 111

(step S1108). If the updating frequency of the data having a dependent relation is not larger than the threshold (step S1107: NO), updating frequency of the data is low even if stored to the cache. For this reason, the scheduler 110 proceeds to step S1109 without setting a priority level.

The scheduler 110 sets, as simulated tasks, the parallel tasks under processing (step S1109), and returns to step S1104 to determine whether an unsimulated parallel task is present.

Whenever determining that an unsimulated parallel task is present at step S1104, the scheduler 110 repeats simulations through the operations at steps S1105 to S1109 and thereby, sets the priority levels of parallel tasks. When determining at step S1104 that an unsimulated parallel task is not present (step S1104: NO), the scheduler 110 ends the series of operations since simulations of all parallel tasks have been completed.

As described, the scheduler 110 can make the task table 111 by executing each of the steps in FIG. 11. While the above task table making process is executed mainly by the scheduler 110, the task making process may be executed in advance mainly by a compiler or simulator.

For example, the analysis at steps S1101 to S1103 may be executed by an ordinary compiler. The simulation at step S1105 using the results of analysis at steps S1101 to S1103 may be executed by a known simulator that estimates the execution time and the frequency of updating at the execution of each task (see, e.g., Japanese Laid-Open Patent Publication No. 2000-276381).

FIG. 12 is a data table depicting an example of the data structure of the task table. FIG. 13 is a data table depicting an example of setting of the task table. The data table 1200 of FIG. 12 represents an example of the data structure of the task table 111 made by the task table making process depicted in FIG. 11.

As indicated in the data table 1200, the task table 111 is made up of fields of information representing task information and fields of information representing shared data information. In empty fields in the task table 111, such as fields of task name, task ID, and deadline, different values are entered for different tasks. In fields for selective entry of two values "o"/"x", such as fields of priority level and coherence mode, one of two values is entered.

<Task Information>
Task name: (Name of task)
Task ID: (Identifier for task)
Deadline: (Result of analysis at step S1102)
Priority level: High/Low (Contents of setting at step S1108)
Coherence mode: Updating at writing/Updating at reading
Fork to other CPU: Permitted/Not permitted
<Shared Data Information>
Shared data name: (Name of data)
Shared data ID: (ID for data)
Updating frequency: (Result of measurement at step S1106)
Level of cache in which data is saved: L1 (cache L1$)/(cache L2$)
Data size: (Result of analysis at step S1101)

Of the above task information, "Coherence mode", "Fork to other CPU", and "Level of cache in which data is saved" are determined when a task is executed. For example, "Coherence mode" and "Fork to other CPU" are determined through a task execution process, which will be described later with reference to FIGS. 14 to 17. "Level of cache in which data is saved" is determined through the shared data saving process depicted in FIG. 10. The task table 111 with specific numerical values entered therein is indicated as the data table 1200 of FIG. 13.

FIGS. 14, 15, 16, and 17 are flowcharts of a procedure of the task execution process. The flowcharts of FIGS. 14 to 17 represent a procedure that is performed to cause each core to execute a parallel task to be executed. By carrying out each of steps of FIGS. 14 to 17, a parallel task to be executed is executed based on a coherence method corresponding to a priority level set in the task table 111 or the priority level of another parallel task under execution.

In FIG. 14, the scheduler 110 determines whether state transition of a task to be executed has occurred (step S1401). State transition at step S1401 refers to events of "task generation", "task completion", and "task switching". If determining that state transition has occurred at step S1401, the scheduler 110 further determines which of the above three events has occurred.

At step S1401, the scheduler 110 stands by until state transition occurs (step S1401: NO). When determining at step S1401 that an event of task generation has occurred among the events of state transition (step S1401: YES for task generation), the scheduler 110 determines whether the task to be executed is a parallel task (step S1402).

When determining at step S1402 that the task to be executed is a parallel task (step S1402: YES), the scheduler 110 determines whether the newly generated parallel task is a master thread (step S1403). The master thread is a thread that is executed preferentially.

When determining at step S1403 that the newly generated parallel task is a master thread (step S1403: YES), the scheduler 110 further determines whether the newly generated parallel task is a high-priority task (step S1404). At step S1404, whether the newly generated parallel task is a high-priority task can be determined by referring to the task table 111.

When determining at step S1404 that the newly generated parallel task is a high-priority task (step S1404: YES), the scheduler 110 further determines whether the CPU is executing a high-priority task (step S1405).

When determining at step S1405 that the CPU is executing a high-priority task (step S1405: YES), the scheduler 110 executes a preparatory process for executing the task to be executed. The scheduler 110 causes the parallel task under execution to migrate to a CPU having the lowest load among CPUs executing parallel threads (data migration), and prohibits the forking of a new thread to another CPU during execution of the parallel task (prohibits generation of a copy of a new thread) (step S1406).

The scheduler 110 locks a cache area to which shared data for the task having migrated at step S1406 is saved (step S1407). The scheduler 110 sequentially executes the migrated tasks (step S1408), prohibits the forking of a thread from a newly generated parallel task to another CPU, and assigns the parallel task to a CPU having the lowest load (step S1409).

Subsequently, the scheduler 110 locks a cache area to which shared data for the newly generated parallel task is saved, and starts executing the task (step S1410). When the operation at step S1410 is over, the scheduler 110 returns to step S1401, and keeps standing by until state transition newly occurs.

When determining at step S1403 that the newly generated parallel task is not a master thread (step S1403: NO), the scheduler 110 determines whether the forking of a thread is prohibited (step S1411). A thread for which a determination at step S1403 is made is a thread making up the newly generated parallel task.

When determining at step S1403 that the forking of a thread from the newly generated task is prohibited (step S1411: YES), the scheduler 110 queues the newly generated task to a CPU that executes the master thread (step S1412). The task queued at step S1412 is executed by the CPU to which the task is queued, after completion of the task currently under execution. When the operation at step S1412 is over, the scheduler 110 returns to step S1401, and keeps standing by until state transition newly occurs.

When determining that the newly generated task is not a parallel task (step S1402: NO) or that the forking of a thread is not prohibited (step S1411: NO), the scheduler 110 queues the task to the CPU having the lowest load (step S1413). The task queued at step S1413 is the task having been determined to be a newly generated task at step S1401. When the operation at step S1413 is over, the scheduler 110 returns to step S1401, and keeps standing by until state transition newly occurs.

FIG. 15 is a flowchart of a process performed by the scheduler 110 upon determining at step S1401 that task completion has occurred (step S1401: YES for task completion) and that task switching has occurred (step S1401: YES for task switching).

In FIG. 15, when the scheduler 110 determines at step S1401 that task completion has occurred (step S1401: YES for task completion), the scheduler 110 releases the locked cache area to which shared data for a parallel task has been saved (step S1501).

The scheduler 110 determines whether a task awaiting execution is present (step S1502). When determining at step S1502 that a task standing by for execution is present (step S1502: YES), the scheduler 110 proceeds to step S1503 and executes the task standing by. When determining at step S1502 that a task standing by for execution is not present (step S1502: NO), the scheduler 110 returns to step S1401 and keeps standing by until the next state transition occurs.

When determining at step S1401 that task switching has occurred (step S1401: YES for task switching), the scheduler 110 determines whether a task to which a task execution right is to be delivered is a low-priority parallel task (step S1503). When determining at step S1502 that a task standing by for execution is present (step S1502: YES), the scheduler 110 also performs the same determination as at step S1503.

When determining at step S1503 that the task to which the task execution right is to be delivered is a low-priority parallel task (step S1503: YES), the scheduler 110 adopts a cache coherence method for executing a low-priority parallel task, which means that the scheduler 110 sets the CPU cache coherence mode to a mode in which the snoop mechanism is actuated when another CPU accesses data (step S1504).

When determining at step S1503 that the task to which the task execution right is to be delivered is not a low-priority parallel task (step S1503: NO) or when the operation at step S1504 is finished, the scheduler 110 starts executing the task to be executed (step S1505). After the task is executed at step S1505, the scheduler 110 returns to step S1401, and keeps standing by until the next task state transition occurs.

FIG. 16 is a flowchart of a process that is performed by the scheduler 110 upon determining at step S1404 that a newly generated parallel task is not a high-priority task (step S1404: NO).

In FIG. 16, when the scheduler 110 determines at step S1404 that a newly generated parallel task is not a high-priority task (step S1404: NO), the scheduler 110 determines whether a high-priority task is currently under execution (step S1601), that is, determines whether a CPU to execute the newly generated task is currently executing a high-priority task.

When determining at step S1601 that a high-priority task is currently under execution (step S1601: YES), the scheduler 110 adopts the cache coherence method for executing a low-priority parallel task, which means that the scheduler 110 sets the cache coherence mode for a parallel task under execution to a mode in which the snoop mechanism of the snoop 120 is actuated when another CPU accesses data (step S1602).

Subsequently, the scheduler 110 queues the task to be executed to the CPU having the lowest load (step S1603), and proceeds to step S1401. The task queued at step S1603 is executed after the task currently under execution is completed. The CPU having the lowest load means the CPU having the lowest volume of queued tasks to be processed. The scheduler 110 having proceeded to step S1401 keeps standing by until the next state transition occurs.

When determining at step S1601 that a high-priority task is not currently under execution (step S1601: NO), the scheduler 110 adopts a cache coherence method for executing a high-priority parallel task. This means that the scheduler 110 causes a parallel task under execution to migrate to the CPU having the lowest load among other CPUs executing parallel threads included in the parallel task, and prohibits a new thread included in the parallel task from forking to another CPU during execution of the task (step S1604).

The scheduler 110 causes the CPU to sequentially execute the tasks having migrated thereto at step S1604 (step S1605). The scheduler 110 prohibits a thread included in a newly generated parallel task from forking to another CPU, and queues the parallel task to the CPU having the lowest load (step S1606).

The task queued at step S1606 is executed after the task currently under execution is completed. When the operation at step S1606 is finished, the scheduler 110 proceeds to step S1401 and keeps standing by until state transition newly occurs.

FIG. 17 is a flowchart of a process that is performed by the scheduler 110 upon determining at step S1405 that the CPU is not executing a high-priority task when a newly generated parallel task is determined to be a high-priority task (step S1405: NO).

In FIG. 17, when the scheduler 110 determines at step S1405 that the process-executing CPU is not executing a high-priority task (step S1405: NO), the scheduler 110 assigns a newly generated task to the CPU having the lowest load (step S1701).

The scheduler 110 determines whether the newly generated parallel task does not meet a deadline condition when executed sequentially (step S1702). At step S1702, the scheduler 110 determines whether the parallel task does not meet the deadline condition, based on the set deadline condition listed in the task table 111.

When determining at step S1702 that the newly generated parallel task does not meet the deadline condition (step S1702: YES), the scheduler 110 further determines whether a low-priority parallel task is currently under execution (step S1703).

When determining at step S1703 that a low-priority parallel task is currently under execution (step S1703: YES), the scheduler 110 adopts the cache coherence method for executing a low-priority parallel task, which means that the scheduler 110 sets the cache coherence mode for a parallel task under execution to a mode in which the snoop mechanism is actuated when another CPU accesses data (step S1704).

When the operation at step S1704 is finished, the scheduler 110 locks the cache area to which shared data for the newly generated parallel task has been saved (step S1705). When determining at step S1703 that a low-priority parallel task is not currently under execution (step S1703: NO), the scheduler 110 adopts an ordinary coherence method. The scheduler 110, therefore, does not perform the operation at step S1704 and proceeds to step S1705.

When the operation at step S1705 is finished, the scheduler 110 starts execution of the newly generated parallel task (step S1706), and returns to step S1401 to keep standing by until the next state transition occurs.

When determining at step S1702 that the newly generated parallel task meets the deadline condition (step S1702: NO), the scheduler 110 locks the cache area to which shared data for the newly generated parallel task has been saved (step S1707).

The scheduler starts sequential execution of the newly generated parallel tasks (step S1708). Subsequently, the scheduler returns to step S1401 and keeps standing by until the next task state transition occurs.

As described, the scheduler can perform task scheduling so that a task is executed by the optimum CPU based on what priority level (high-priority/low-priority) is given to each task identified as a parallel task and based on whether parallel tasks are given the same priority level. The scheduler 110 sets a cache coherence method for shared data according to the priority level of each task, thereby preventing a drop in the utilization efficiency of the cache memory (cache L1$).

An operation example in a case of applying a scheduling process of the embodiment to a communication device will be described. For example, parallel tasks executed by a portable communication device, such as smart phone, and a stationary communication device, such as server, will be described.

FIG. 18 is an explanatory diagram of an example of execution of parallel tasks having the same priority level. In FIG. 18, a smart phone 1801 communicates with another smart phone 1802 in compliance with the wireless LAN (WLAN) protocol. The smart phone 1801 also communicates with a server 1803 in compliance with the long term evolution (LTE) protocol.

Tasks (WLAN #0 and #1) in compliance with the WLAN protocol and tasks (LTE #0 and #1) in compliance with the LTE protocol both meet real-time conditions, and are therefore treated as high-priority tasks. Hence, the smart phone 1801 executes the tasks (WLAN #0 and #1) and (LTE #0 and #1) as parallel tasks having the same priority level. Because parallel tasks having the same priority level are executed, the snoop 120 of the smart phone 1801 adopts the snoop method for performing ordinary cache coherency.

FIG. 19 is an explanatory diagram of an example of execution of parallel tasks having differing priority levels. In FIG. 19, the smart phone 1801 communicates with the server 1803 in compliance with the LTE protocol. The smart phone 1801 also executes tasks (driver #0 and #1) for a driver application not requiring communication.

The driver application executed by the smart phone 1801 is free from a real-time condition, and is therefore treated as a low-priority task. Hence, the smart phone 1801 executes the tasks (LTE #0 and #1) as high-priority parallel tasks and the tasks (driver #0 and #1) as low-priority parallel tasks. Because parallel tasks having differing priority levels are executed, the snoop 120 of the smart phone 1801 adopts the snoop method for performing cache coherency for low-priority parallel tasks in execution of the tasks LTE #0 and #1.

As described, according to the scheduler, multi-core processor system, and the scheduling method, shared data having a high frequency of use is preferentially saved to a cache memory accessed at high speed. As a result, processing speed can be improved.

In the case of shared data for a process given a low-priority level, the synchronization process for establishing cache coherency is postponed until an access request to the shared data is issued from a CPU, thereby preventing operation that causes the processing performance of the multi-core processor system to drop, such as the writing of shared data that is not subsequently used again, to the cache memory. When the parallel processing and multi-task processing are executed, therefore, the utilization efficiency of the cache is enhanced to improve the processing performance of the multi-core processor system.

When a high-priority task is not present and the cache memory has a vacant area, shared data for a low-priority task may be saved to the cache memory of each CPU. Even when a high-priority task is not present, therefore, the cache memory can be used efficiently.

Shared data that is accessed when a high-priority task saved to the cache memory is executed may be kept locked until the high-priority task is completed. Locking the shared data for the high-priority task prevents a case where the shared data for the high-priority task is overwritten with shared data for another task at the occurrence of task switching, thus allowing efficient execution of the high-priority task.

When shared data accessed by a high-priority task at execution thereof is larger than the capacity of the cache memory and cannot be entirely saved to the cache memory, the shared data may be saved to a memory area accessed at high speed, among memory areas other than the cache memory. If multiple memory areas are available when the shared data is saved, the shared data is saved to the memory areas in descending order of the access speed of the memories. In this manner, the shared data for the high-priority task is preferentially saved to a memory area accessed at high speed and therefore, efficient processing can be expected.

When the volume of shared data accessed by a high-priority task at execution thereof is smaller than the capacity of the cache memory and an area of the cache memory remains available for data storage, shared data for a low-priority task may be saved to the available area. Saving the shared data for the low-priority task to the available area prevents the cache memory from having a vacant area, thus maintains high cache utilization efficiency.

When multiple memory areas are provided as a memory area different from the cache memory of each CPU, shared data may be saved to the memory areas in descending order of the speed at which the memory areas are accessed. By saving shared data for each task preferentially to a memory area accessed at high speed regardless of the priority level of shared data, tasks can be executed efficiently.

Parallel tasks extracted from among tasks to be executed may be assigned to the same core. Parallel tasks having the same priority level and extracted from among the tasks to be executed may also be assigned to the same core. Assigning parallel tasks of the same priority level to the same core allows efficient use of shared data saved to the cache memory.

The scheduling method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A scheduler that causes a given core in a multi-core processor to execute processing comprising:
    determining if a priority level of a process that is to be executed and among a group of processes assigned to and executed by cores of the multi-core processor is greater than or equal to a threshold;
    saving to a cache memory of each core that executes among processes to be executed, a high-priority process for which the priority level has been determined to be greater than or equal to the threshold, data that is accessed by the high-priority process upon execution;
    saving to a memory area different from the cache memory and to which access is slower than access to the cache memory, data that is accessed by a low-priority process for which the priority level has been determined to not be greater than or equal to the threshold; and
    saving the data saved in the memory area, to a cache memory of a requesting core in the multi-core processor, when the requesting core issues an access request for the data saved in the memory area.

2. The scheduler according to claim 1, wherein
    the saving to the cache memory includes saving to a cache memory of each core that executes the low-priority process, the data that is accessed by the low-priority process upon execution, when the high-priority process is not present among processes to be executed.

3. The scheduler according to claim 1, wherein
    the saving to the cache memory includes prohibiting until execution of the high-priority process is completed, overwriting with different data, the data that is saved to the cache memory of each core executing the high-priority process and that is accessed by the high-priority process upon execution.

4. The scheduler according to claim 1, the processing further comprising identifying a capacity of a rewritable area in a cache memory of each core of the multi-core processor when the determining is performed, wherein
    the saving to the cache memory includes saving to the cache memory in descending order of updating frequency and when an identified capacity of a rewritable area is smaller than a volume of the data accessed by the high-priority process upon execution, the data accessed by the high-priority process and of a volume that can be stored in the cache memory, and
    the saving to the memory area includes saving to the memory area, the data that cannot be saved to the cache memory at the saving to the cache memory.

5. The scheduler according to claim 4, wherein
    the saving to the cache memory includes saving to the cache memory in descending order of updating frequency, after the saving of the data accessed by the high-priority process is completed and when an identified capacity of a rewritable area is larger than a volume of the data accessed by the high-priority process upon execution, the data accessed by the low-priority process upon execution and of a volume that can be saved in the cache memory.

6. The scheduler according to claim 1, wherein
    the memory area is among a plurality of memory areas respectively differing in access speed,
    the saving to the memory area includes saving to the memory areas in descending order of access speed, the data accessed by the low-priority process upon execution and of a volume that can be stored to the respective memory area.

7. The scheduler according to claim 1, the processing further comprising:
    extracting from the processes to be executed, processes that access common data upon execution; and
    assigning the extracted processes to a single core among the cores of the multi-core processor.

8. The scheduler according to claim 7, wherein the assigning includes assigning to the single core, processes having an identical priority level, among the extracted processes.

9. A multi-core processor system comprising a given core configured to:
    determine if a priority level of a process that is to be executed and among a group of processes assigned to and executed by cores of the multi-core processor is greater than or equal to a threshold;
    save to a cache memory of each core that executes among processes to be executed, a high-priority process for which the priority level has been determined to be greater than or equal to the threshold, data that is accessed by the high-priority process upon execution;
    save to a memory area different from the cache memory and to which access is slower than access to the cache memory, data that is accessed by a low-priority process for which the priority level has been determined to not be greater than or equal to the threshold; and
    save the data saved in the memory area, to a cache memory of a requesting core in the multi-core processor, when the requesting core issues an access request for the data saved in the memory area.

10. A scheduling method executed by a given core in a multi-core processor, the scheduling method comprising:
    determine if a priority level of a process that is to be executed and among a group of processes assigned to and executed by cores of the multi-core processor is greater than or equal to a threshold;
    save to a cache memory of each core that executes among processes to be executed, a high-priority process for which the priority level has been determined to be greater than or equal to the threshold, data that is accessed by the high-priority process upon execution;
    save to a memory area different from the cache memory and to which access is slower than access to the cache memory, data that is accessed by a low-priority process for which the priority level has been determined to not be greater than or equal to the threshold; and
    save the data saved in the memory area, to a cache memory of a requesting core in the multi-core processor, when the requesting core issues an access request for the data saved in the memory area.

* * * * *